(12) United States Patent
Robinson et al.

(10) Patent No.: US 10,929,564 B2
(45) Date of Patent: Feb. 23, 2021

(54) URL EVALUATION FOR MOBILE WEB BROWSERS

(71) Applicant: Finjan Mobile, Inc., East Palo Alto, CA (US)

(72) Inventors: Scot Robinson, Rolling Hills Estates, CA (US); Patrick Conlin, Newport Beach, CA (US); Jules Panopoulos, Mountain View, CA (US); Julie Mar-Spinola, San Jose, CA (US)

(73) Assignee: Finjan Mobile, Inc., East Palo Alto, CA (US)

( * ) Notice: Subject to any disclaimer, the term of this patent is extended or adjusted under 35 U.S.C. 154(b) by 0 days.

(21) Appl. No.: 16/373,642

(22) Filed: Apr. 3, 2019

(65) Prior Publication Data

US 2019/0228185 A1 Jul. 25, 2019

Related U.S. Application Data

(60) Division of application No. 15/784,139, filed on Oct. 15, 2017, now Pat. No. 10,303,898, which is a
(Continued)

(51) Int. Cl.
*G06F 16/955* (2019.01)
*G06F 21/62* (2013.01)
(Continued)

(52) U.S. Cl.
CPC ...... *G06F 21/6263* (2013.01); *G06F 3/04812* (2013.01); *G06F 16/9566* (2019.01);
(Continued)

(58) Field of Classification Search
CPC ..... H04L 63/145; H04L 67/02; H04L 63/168; H04L 63/0272; H04L 63/04; H04L 63/1416; H04L 63/1466; H04L 63/1483; H04L 12/4641; H04L 61/6018; H04L 63/14; H04L 67/22; H04L 65/80; G06F 21/554; G06F 21/6263; G06F 16/9566; G06F 21/562; G06F 21/566;
(Continued)

(56) References Cited

U.S. PATENT DOCUMENTS 9,239,907 B1 * 1/2016 Park .................. G06F 21/56
10,394,796 B1 * 8/2019 Dang ................. G06F 16/2365
(Continued)

*Primary Examiner* — Trang T Doan
(74) *Attorney, Agent, or Firm* — Soquel Group I.P. Ltd.

(57) ABSTRACT

A computer readable medium causing a processor to evaluate a URL: when an evaluation resides in a cache, determine whether the URL is safe based on the evaluation, and when an evaluation does not reside in cache: perform an evaluation for the URL using one or more virus scanners, store the evaluation in the cache and determine whether the URL is safe based on the evaluation, when the URL is safe, load and display the web page for the URL, and when the URL is not safe, block the web page for the URL from being loaded and displayed, further determine whether a QA check criterion is met, if so, send the URL to an evaluator for behavioral analysis of the web page of the URL, and store results of the behavioral analysis of the web page of the URL, received from the evaluator, in a QA database.

10 Claims, 24 Drawing Sheets

Related U.S. Application Data continuation-in-part of application No. 15/069,981, filed on Mar. 15, 2016, now Pat. No. 10,091,214.

(60) Provisional application No. 62/517,882, filed on Jun. 10, 2017, provisional application No. 62/480,453, filed on Apr. 2, 2017, provisional application No. 62/412,034, filed on Oct. 24, 2016, provisional application No. 62/159,862, filed on May 11, 2015.

(51) Int. Cl.

| | | |
|---|---|---|
| *G06F 21/56* | (2013.01) | |
| *H04L 29/06* | (2006.01) | |
| *G06F 3/0481* | (2013.01) | |
| *G06F 21/55* | (2013.01) | |
| *H04L 29/08* | (2006.01) | |

(52) U.S. Cl.
CPC .......... *G06F 21/554* (2013.01); *G06F 21/562* (2013.01); *G06F 21/566* (2013.01); *H04L 63/04* (2013.01); *H04L 63/145* (2013.01); *H04L 63/1416* (2013.01); *H04L 63/1466* (2013.01); *H04L 63/1483* (2013.01); *H04L 63/168* (2013.01); *H04L 67/02* (2013.01)

(58) Field of Classification Search
CPC .................. G06F 3/04812; G06F 21/56; G06F 2221/2119; G06F 16/95; G06F 16/9537; G06F 16/957; G06F 11/3438; G06F 16/9558; G06F 16/9574; H04W 80/04; H04W 88/02; H04W 12/0013; H04W 12/02; H04W 12/1208
See application file for complete search history.

(56) References Cited

U.S. PATENT DOCUMENTS

| | | | | |
|---|---|---|---|---|
| 2012/0011588 | A1* | 1/2012 | Milener | H04L 63/1425 726/24 |
| 2012/0324094 | A1* | 12/2012 | Wyatt | H04L 43/0876 709/224 |
| 2016/0173523 | A1* | 6/2016 | Milener | G06F 21/51 726/25 |
| 2016/0191554 | A1* | 6/2016 | Kaminsky | G06F 21/31 726/23 |
| 2017/0054739 | A1* | 2/2017 | Wardman | H04L 63/1441 |

* cited by examiner

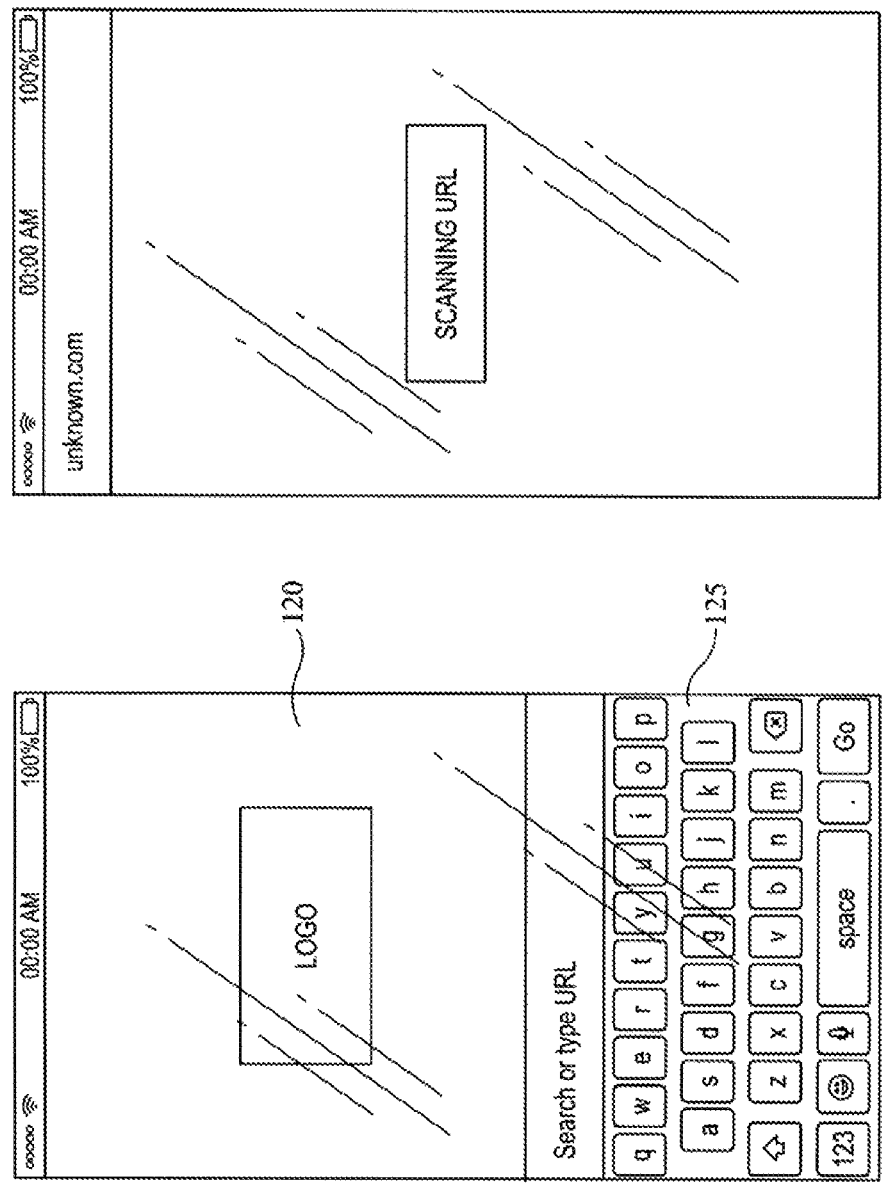

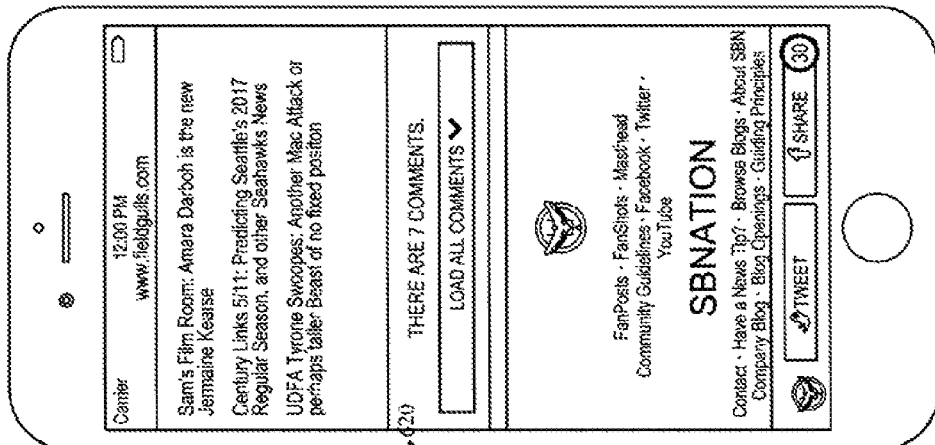
FIG. 31
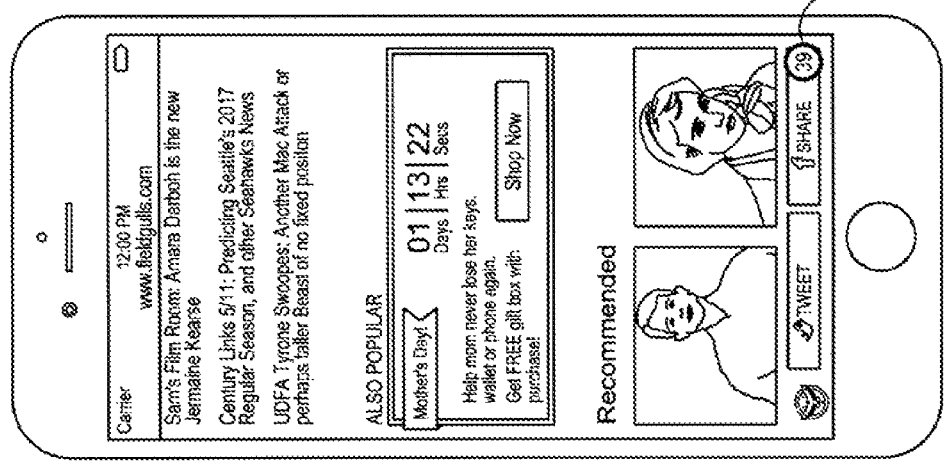
FIG. 30
FIG. 29

URL EVALUATION FOR MOBILE WEB BROWSERS

PRIORITY REFERENCE TO RELATED APPLICATIONS

This application claims benefit of U.S. Provisional Application No. 62/517,882, entitled DETECTION AND BLOCKING OF WEB TRACKERS FOR MOBILE BROWSERS, and filed on Jun. 10, 2017 by inventors Scot Robinson, Patrick Conlin, Jules Panopolous and Julie Mar-Spinola, the contents of which are hereby incorporated by reference.

This application claims benefit of U.S. Provisional Application No. 62/480,453, entitled ADVANCED MALWARE WARNING SYSTEM AND METHOD, and filed on Apr. 2, 2017 by inventors Scot Robinson, Patrick Conlin, Jules Panopolous, Sang Hui Michael Kim and Julie Mar-Spinola, the contents of which are hereby incorporated by reference.

This application claims benefit of U.S. Provisional Application No. 62/412,034, entitled ADVANCED MALWARE WARNING SYSTEM AND METHOD, and filed on Oct. 24, 2016 by inventors Michael Godlewski, Geoffrey House, Winnie Tong, Rudolph Mutter, Bay Lee Feore, Timothy Shipman, Anthony Scherba, Lee McDole, Alexander Lin Kremer, Julie Mar-Spinola, Scot Robinson, Patrick Conlin, Jules Panopolous and Sang Hui Michael Kim, the contents of which are hereby incorporated by reference.

This application is a continuation-in-part of U.S. patent application Ser. No. 15/069,981, entitled MALWARE WARNING, and filed on Mar. 15, 2016 by inventors Michael Godlewski, Geoffrey House, Winnie Tong, Rudolph Mutter, Bay Lee Feore, Timothy Shipman, Anthony Scherba, Lee McDole, Alexander Lin Kremer and Julie Mar-Spinola, the contents of which are hereby incorporated by reference.

U.S. patent application Ser. No. 15/069,981 claims benefit of U.S. Provisional Application No. 62/159,862, entitled SECURE BROWSER APPLICATION, and filed on May 11, 2015 by inventors Michael Godlewski, Geoffrey House, Winnie Tong, Rudolph Mutter, Bay Lee Feore, Timothy Shipman, Anthony Scherba and Julie Mar-Spinola, the contents of which are hereby incorporated by reference.

FIELD OF THE INVENTION

The present invention relates to computer privacy.

BACKGROUND OF THE INVENTION

Web tracking is the activity of a website to track and engage its visitors by pushing advertising and content, and to analyze visitor behavior. Web tracking is generally performed by software, such as Javascript, that is embedded in a web page, e.g., the Javascripts shown below appear in a CNN International web page. Portions of the Javascripts are underlined, showing various trackers from Twitter, Facebook, Google and many others being pushed to viewers of the web page.

For reasons of privacy it would be of advantage to provide a user with an option to block tracking, if he prefers not to be tracked. However, the challenge to providing such an option is that when a web browser opens a web page, the browser generally does not recognize those portions of the page that relate to tracking; and even if the browser were to recognize such portions, the browser would need a mechanism in place to block them.

```
<script id="js-set-epic-spec">
   (function setRefDom(win, doc, registryFile)
      {var edition = ((registryFile &&
registryFile.split('_') [0]) | | 'international').toUpperCase( ),host =
doc.referrer.replace(/^http(?:s)?\:\/\/([\w\-\.]+).*$/i,
'$1').toLowerCase( );
      win[edition] = win[edition] | | { };win[edition].adTargets =
window[edition].adTargets | | { };
      if (host.search(/^([\w\-]+\.)*money\.cnn\.com$/) >= 0)
         {win[edition].adTargets.refdom = 'money';}
      else if (host.search(/^([\w\-
]+\.)*(www|us|edition|next)\.cnn\.com$/) >= 0)
         {win[edition].adTargets.refdom = 'cnn';}
      else if (host === 't.co')
         {win[edition].adTargets.refdom = 'twitter';}
      else if (host.search(/^([\w\-]+\.)*facebook\.com$/) >= 0
         {win[edition].adTargets.refdom = 'facebook';}
      else if (host.search(/^([\w\-
]+\.)*google\.\w{2,3}(\.\w\w)?$/) >= 0)
         {win[edition].adTargets.refdom = 'google';}
      else
         {win[edition].adTargets.refdom = 'other';}
   CNN.getRefDom = function getRefDom( )
      {return win[edition].adTargets.refdom;};
      if (CNN.PageParams && typeof CNN.PageParams.adkey ===
'string')
         {win[edition].adTargets.adkey = CNN.PageParams.adkey;}
      CNN.getAdkey = function getAdkey( ){return
win[edition].adTargets.adkey | | null;};
      if
(CNN.Utils.exists(CNN.contentModel.analytics.cap_topics))
         {win[edition].adTargets.capTopics =
CNN.contentModel.analytics.cap_topics.split(/,\s*/);}
      CNN.getCapTopics = function getCapTopics( ) {var capTopics =
{ },i,topics;
      if (Array.isArray(win[edition].adTargets.capTopics)
&&CNN.Utils.exists(win[edition].adTargets.capTopics[0])
&&win[edition].adTargets.capTopics[0] !== 'no-value-set')
         {topics = win[edition].adTargets.capTopics;
         for (i = 0; i < topics.length; i++)
         {capTopics[topics[i]] = 'cap';}}return capTopics;};
   }
   (window, document, 'cnni_homepage'));
</script>
<script>
   CNN.adTargets = {protocol: "non-ssl"};
   CNN.AdsConfig = {
      enableAdLock: false,
      enableGalleryAdRefresh:true,
      galleryAdClicks: 4,
      amazon: {"amznkey":"3288"},
      companionAdStates: [
         {
         "label": "small",
         "minWidth":0},
         {
            "label": "large",
            "minWidth":768}],
      desktopSSID: 'edition.cnn.com_main_homepage',
      mobileSSID: 'edition.cnn.com_mobile_mobileweb_homepage',
   CNN.Edition = "international";
   CNN.EditionCookie = "PreferredEdition";
   CNN.Features = {
      enableAdsConsole: true,
      enableAmazonDisplayAds: true,
      enableEpicAds: true,
      enableFreewheel: true,
      enableGalleryAds: true,
      enableGigyaLogin: true,
      enableKrux: true,
      enableLiveFyre: true,
      enableProximic: true,
      enableRubiconFastlane: true,
      enableAmazonVideoAds: true,
      enableChartbeat: true,
      enableChartbeatMAB: true,
      enableOmniture: true,
      enableOptimizely: true,
      enableOutbrain: true,
      enableOutbrainVideoKPI: true,
      enableZoneOutbrain: true,
```

-continued

```
CNN.Chartbeat =
{"MABsrc":"//static.chartbeat.com/js/chartbeat_mab.js","src":"//stat
ic.chartbeat.com/js/chartbeat.js","uid":37612};
    CNN.Host = {
      assetPath: "http://edition.i.cdn.cnn.com/.a/2.20.3",
      chrome: "//i.cdn.cnn.com/cnn",cssPath: "/css/2.20.3",
      domain: "http://edition.cnn.com",
      main: "edition.cnn.com",
      sponsorContent: "http://s3.amazonaws.com/cnn-sponsored-
content",
      intl: "http://edition.cnn.com",
      us: "http://us.cnn.com",
      www: "http://www.cnn.com"};
</script>
```

SUMMARY

Embodiments of the present invention provide a user who is browsing a web page with an option to selectively block trackers in the web page, if he prefers not to be tracked by certain trackers. The user's browser presents the user with a display of trackers detected in the web page, and presents on/off controls enabling the user to turn one or more of the displayed trackers on and off. When the user turns off one or more of the display trackers, the web page is reloaded without those trackers that the user turned off.

There is thus provided in accordance with an embodiment of the present invention a method for blocking web page trackers by a web browser of a mobile device, comprising: loading a web page on a mobile device; scanning the web page to detect scripts in the web page; for each detected script, comparing content of the script with a list of URL connections, to detect trackers present in the script, each URL connection being associated with a corresponding tracker; storing the detected trackers; displaying the stored trackers to a user; enabling a user to selectively block, via said mobile device, one or more of the displayed trackers; and reloading the web page, comprising, for each selected tracker to block, rejecting the URL connection corresponding to the selected tracker.

There is additionally provided in accordance with an embodiment of the present invention a web browser on a mobile device with tracker detection and blocking capability, comprising: a tracker detector (i) scanning a web page loaded by a web browser to detect scripts in the web page, (ii) for each detected script, comparing the script content with a list of URL connections to detect trackers in the script, each URL connection being associated with a corresponding tracker, and (iii) storing the detected trackers on the mobile device; and a tracker blocker (iv) displaying the stored trackers to a user, (v) enabling a user to selectively block one or more of the displayed trackers, and (vi) reloading the web page, comprising, for each selected tracker to block, rejecting the URL connection corresponding to the selected tracker.

There is further provided in accordance with an embodiment of the present invention a non-transitory computer readable medium storing instructions, which, when executed by a processor of an electronic device, cause the processor to receive as input a uniform resource locator (URL) for a web page, in response to receiving the input URL: when a URL evaluation for the input URL resides in a cache, determine whether the URL is deemed safe based on the cached URL evaluation, and when a URL evaluation for the input URL does not reside in cache: perform a URL evaluation for the input URL using one or more virus scanners, store the URL evaluation for the input URL in the cache, and determine whether the input URL is deemed safe based on the performed URL evaluation, when the input URL is deemed safe, load and display the web page for the input URL, and when the input URL is not deemed safe, block the web page for the input URL from being loaded and displayed, further in response to receiving the input URL: determine whether a quality assurance (QA) check criterion is met, when the QA check criterion is met, send the input URL as hypertext transfer protocol (HTTP) form data to an evaluator server, in response to receiving the HTTP form data, send the input URL to an evaluator device for behavioral analysis of the web page of the input URL, and store results of the behavioral analysis of the web page of the input URL, received from the evaluator device, in a QA database.

There is yet further provided in accordance with an embodiment of the present invention a non-transitory computer readable medium storing instructions, which, when executed by a processor of an electronic device, cause the processor to disable URL history logging for a web browser that loads and displays URL web pages, and in response to receiving an instruction from a user to bookmark a URL: advise the user that the bookmark will maintain a history, and prompt the user to confirm generation of the bookmark.

BRIEF DESCRIPTION OF THE DRAWINGS

The present invention will be more fully understood and appreciated from the following detailed description, taken in conjunction with the drawings in which:

FIG. 3 is a screen shot of a simple interface display in which a user is prompted to enter a URL using a keyboard, in accordance with an embodiment of the present invention;

FIG. 4 is a screen shot showing that the user has input a specific identifier (i.e., "unknown.com"), in accordance with an embodiment of the present invention;

FIG. 29 is a screen shot of a web page with tracker detection, before trackers are blocked, in accordance with an embodiment of the present invention;

FIG. 30 is a screen shot of on/off controls for turning tracker blocking on and off, in accordance with an embodiment of the present invention;

FIG. 31 is a screen shot of a web page that is reloaded after trackers are blocked, in accordance with an embodiment of the present invention.

For reference to the figures, the following index of elements and their numerals is provided. Similarly numbered elements represent elements of the same type, but they need not be identical elements.

| Table of elements in the figures | |
|---|---|
| Element | Description |
| 100 | client computing device |
| 110 | client processor |
| 120 | touch-enabled input/output module |
| 125 | touch-based keyboard |
| 130 | web browser |
| 140A | first warning generator |
| 140B | second warning generator (optional) |
| 140C | third warning generator |
| 150 | URL database |
| 160 | tracker detector |
| 170 | tracker blocker |
| 200 | middleware server computing device |
| 210 | middleware server processor |
| 250 | URL database |
| 260 | tracker database |
| 300 | virus scan engine(s) |
| 320 | evaluator server |
| 325 | QA database |
| 350 | search engine(s) |
| 410-460 | display screens |
| 510 | scan results alert bar |
| 521-528 | browser controls |
| 530 | scan control for immediate scanning of a currently active URL page |
| 541-546 | configurable settings for a secure web browser |

Elements numbered in the 1000's are operations of flow charts.

DETAILED DESCRIPTION

In accordance with embodiments of the present invention, modules, systems and methods are provided for protecting a user's privacy when browsing a web page using a mobile phone. Embodiments of the present invention detect trackers that are scripted in the web page that the user is browsing, and enable the user to selectively turn them off.

Client-Based Embodiment

Figure 1:
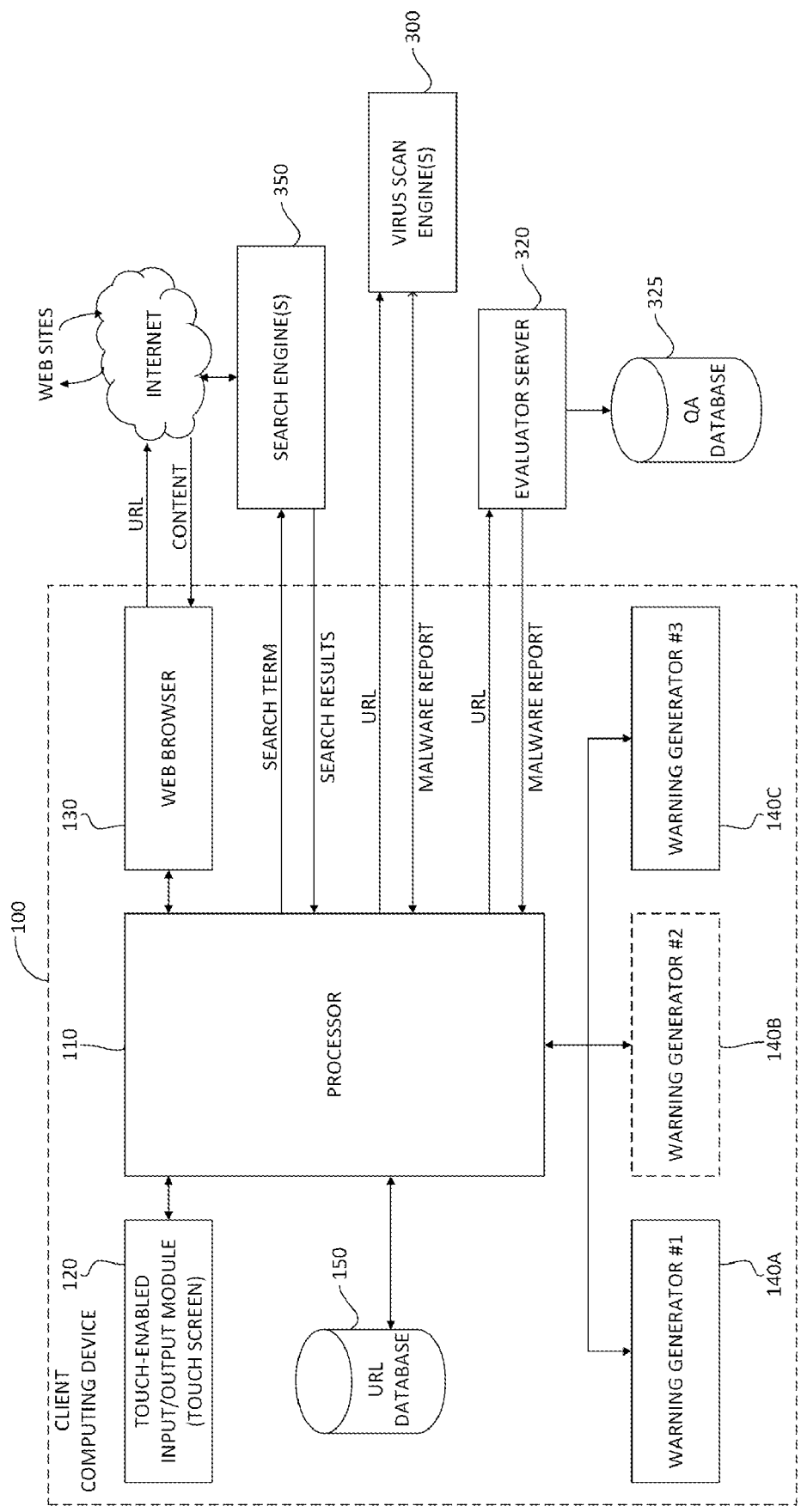
FIG. 1 is a simplified diagram of a client-based embodiment of a malware warning module for URLs, in accordance with an embodiment of the present invention.

Reference is made to FIG. 1, which is a simplified diagram of a client-based embodiment of a malware warning module for URLs, in accordance with an embodiment of the present invention. Shown in FIG. 1 is a client computing device 100 with a processor 110, a touch-enabled input/output (I/O) module 120, such as a touch screen, and a web browser 130. Client 100 also includes a data bus and memory modules that store data and instructions; the memory modules being accessible by processor 110, via the data bus, for processor 110 to perform read and write operations.

In accordance with an embodiment of the present invention, client device 100 is an electronic computing device, including inter alia mobile devices such as smartphones, tablets, laptops, medical devices, Internet of things devices, and computers in vehicles, which have processors, memory and communication interfaces. Client device 100 may be programmed and configured to perform the methods of the present invention described below. Depending on the operating system of client device 100, standard appropriate programming languages for developing and testing applications, including application program interfaces (APIs), pop-up windows and animations, can implement the methods of the present invention.

I/O module 120 provides for touch and gesture input to processor 110, in response to a user touching a surface of the device with an object such as a finger, or sliding his finger along the surface of the device to perform a gesture such as the familiar "swipe" gesture. Web browser 130 may be, for example, the familiar ANDROID®-based or SAFARI® web browser.

Shown in FIG. 1 are three warning generators, 140A, 140B and 140C. Operation of these warning generators is described below. Warning generators 140A, 140B and 140C may be three separate modules, as shown in FIG. 1, they may be combined into fewer modules, or they may be separated into more modules. Warning generators 140A, 140B and 140C may be software, firmware or hardware modules, or a combination of software, firmware and hardware modules.

Also shown in FIG. 1 is a URL database 150, which stores URLs and their scan results, as described below. URL database 150 may reside locally on client device 100, as shown in FIG. 1, or alternatively it may reside remote from client device 100.

Also shown in FIG. 1 are one or more virus scan engines 300, an evaluator server 320, a QA database 325, and one or more search engines 350. Scan engine(s) 300 scan content at a designated URL location for malicious or potentially malicious malware code. Scan engine(s) 300 may be a physical gateway capable of scanning content at a URL location, and/or may be a cloud-based content scanning service. Evaluator server 320 performs behavioral analysis of web pages for quality assurance (QA) and stores results in URL database 150 and in QA database 325, as described below with reference to FIG. 21. Generally, scan engine(s) 300 provide only pass/fail or grade/rating information indicating a threat level for a URL web page, whereas evaluator server 320 performs script behavioral analysis and provides security profile data including a list of suspicious operations performed by a URL web page. Behavioral analysis results in QA database 325 are reported to an administrator.

Use of evaluator server 320 enables behavior analysis results to be stored in QA database 325 for later processing without impacting processing by scan engine(s) 300 in determining threat levels.

Search engine(s) 350 may be a physical or cloud-based search service, such as Microsoft BING®. Evaluator server 320 may be separate from search engine(s) 350, or may be part of search engine(s) 320.

In an embodiment of the present invention, a client application on device 100 interacts with scan engine(s) 300 and with evaluator server 220, transmitting URLs to scan engine(s) 300 and receiving malware reports from scan engine(s) 300, and transmitting URLs to evaluator server 320 and receiving malware reports from evaluator server 320. In another embodiment of the present invention, web browser 130 is itself configured to interact with scan engine(s) 300 and with evaluator server 220.

Figure 2:
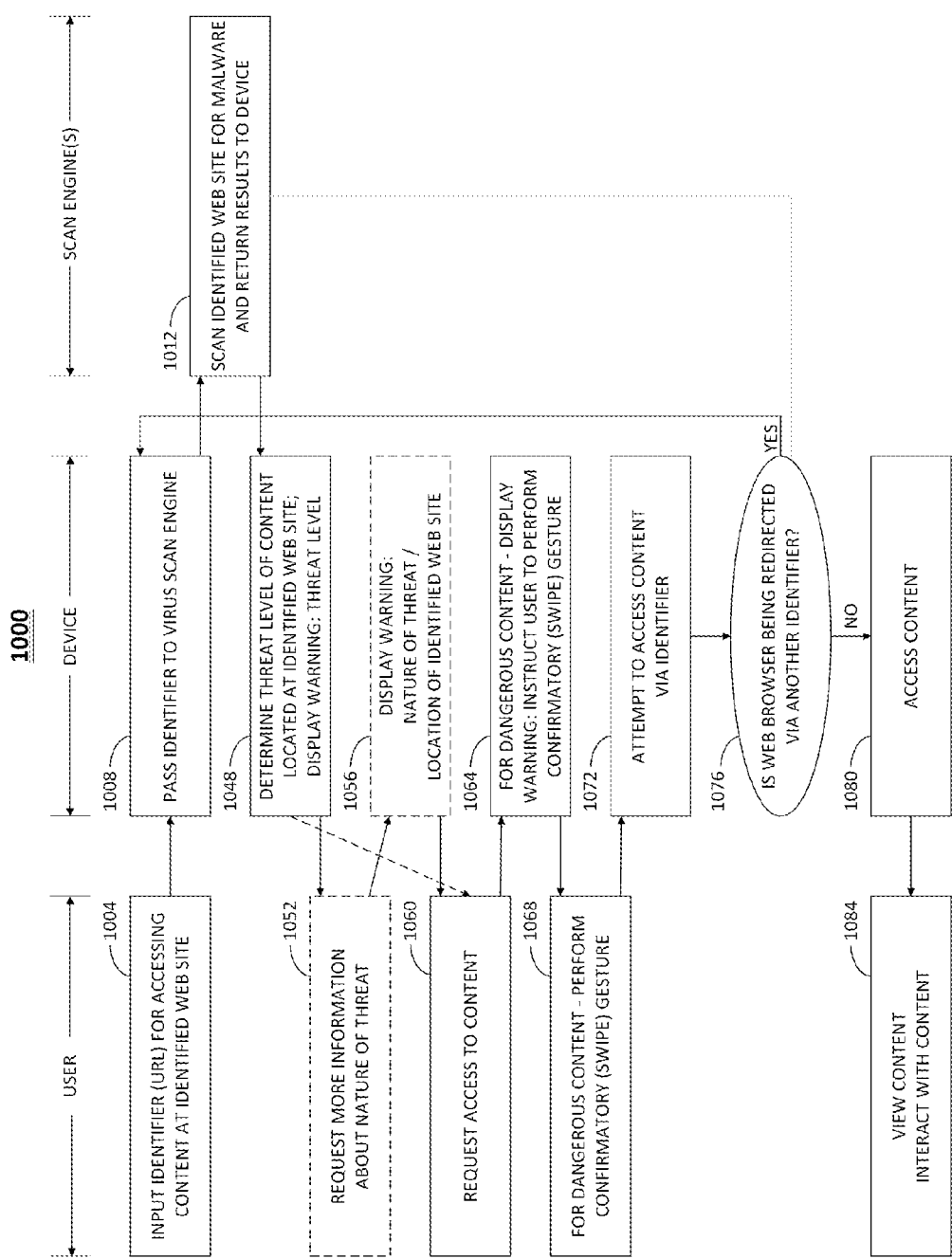
FIG. 2 is a simplified flowchart of a client-based method for malware warning for URLs, in accordance with an embodiment of the present invention.

Reference is made to FIG. 2, which is a simplified flowchart 1000 of a client-based method for malware warning for URLs, in accordance with an embodiment of the present invention. Flowchart 1000 of FIG. 2 is divided into three columns. The left column includes operations performed by a user of client device 100, the middle column includes operations performed by client device 100, and the right column includes operations performed by scan engine(s) 300.

At the beginning of method 1000, the user is prompted to enter an identifier, such as a URL, for accessing web content. In this regard, reference is made to FIG. 3, which is a screen shot of a simple interface display in which a user is prompted to enter a URL using a keyboard 125 displayed in I/O module 120, in accordance with an embodiment of the present invention. At operation 1004, the user enters an identifier for accessing content at a web site that is identified by the identifier. In this regard, reference is made to FIG. 4, which is a screen shot showing that the user has entered a specific identifier, namely, "unknown.com", in accordance with an embodiment of the present invention.

At operation 1008, client device 100 passes the URL to scan engine(s) 300 for analysis. Alternatively, instead of invoking scan engine(s) 300, client device 100 may consult URL database 150, which stores malware information for each of a plurality of URLs. If the specific URL input by the user does not reside in URL database 150, or if it does reside in URL database 150 but its information is out of date, e.g., more than 30 days old, only then does client device 100 pass the URL to scan engine(s) 300 to perform a scan of the URL. When the specific URL input by the user does reside in URL database 150 and its information is up to date, user experience and efficiencies are enhanced by avoiding a scan by scan engine(s) 300.

Figure 5:
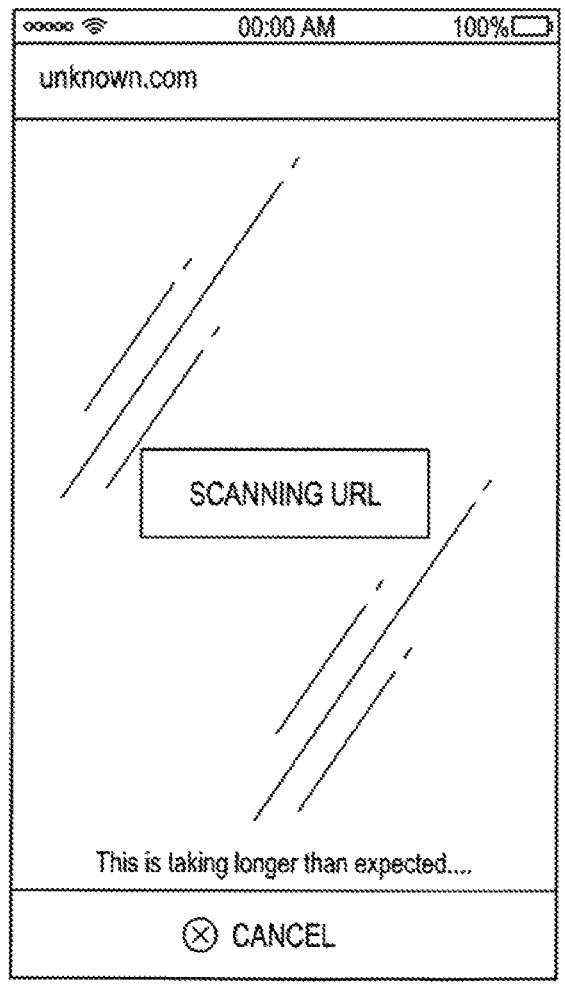
FIG. 5 is a screen shot showing a message, "This is taking longer than expected", displayed while a processor is waiting for scan results, in accordance with an embodiment of the present invention.

Operation 1008 may be performed inter alia by invoking remote or third-party scanners, such as the VirusTotal™ scanner at https://www.virustotal.com, using an API key. VirusTotal provides security results from many different scan engines. More time is required when the URL needs to be scanned, and client device 100 may display a message to the user in response to which the user may either wait or cancel the scan. In this regard, reference is made to FIG. 5, which is a screen shot of a message, "This is taking longer than expected", displayed while client device 100 is waiting for scan results, in accordance with an embodiment of the present invention.

At operation 1012, scan engines(s) 300 scan the content at the URL, and return the results of the scan to client device 100.

At operation 1048, warning generator 140A determines a threat level of the content located at the identified web site, based on the results received from scan engine(s) 300, and generates a first warning including the thus-determined threat level.

Figure 7:
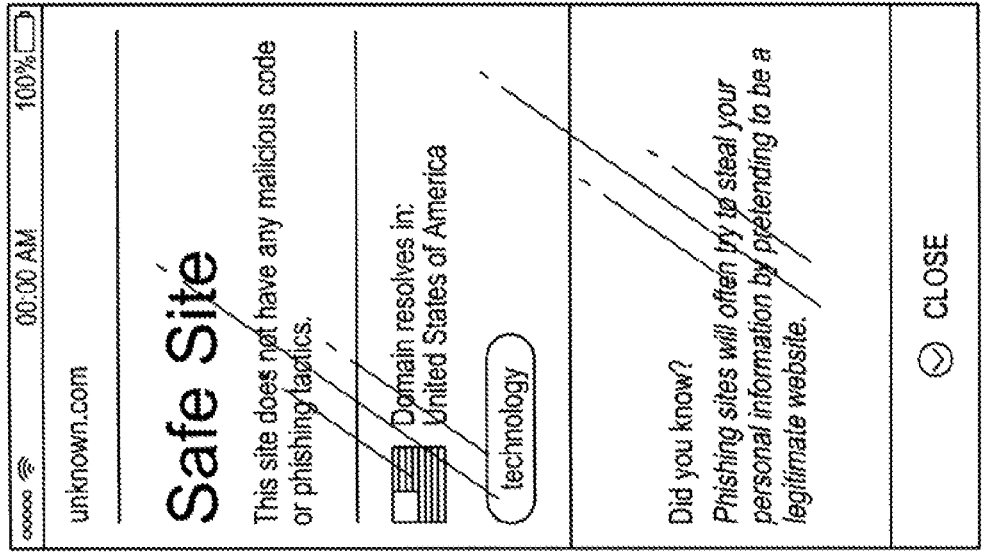
FIG. 7 is a screen shot of a message indicating that a "SAFE" web site does not have any malicious code or phishing tactics, and the location of the web site, in accordance with an embodiment of the present invention.
Figure 6:
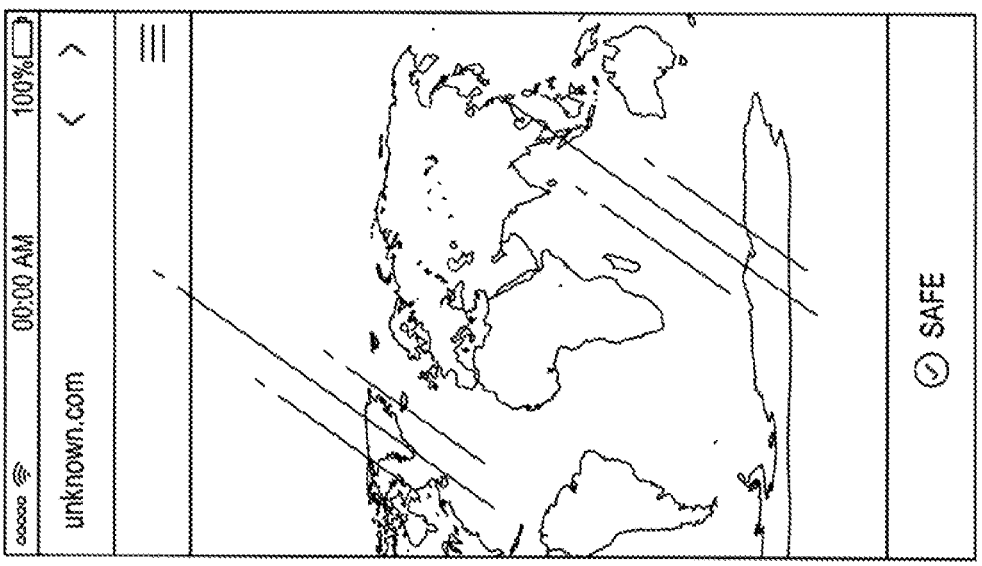
FIG. 6 is a screen shot of a threat level of "SAFE" for a web site, in accordance with an embodiment of the present invention.

In accordance with one embodiment of the present invention, threat levels are categorized as being "SAFE", "SUSPICIOUS" and "DANGEROUS". Reference is made to FIG. 6, which is a screen shot of a threat level of "SAFE" for the web site "unknown.com", in accordance with an embodiment of the present invention. Reference is made to FIG. 7, which is a screen shot of a message displayed by warning generator 140B indicating that the "SAFE" web site does not have any malicious code or phishing tactics, and the location of the web site, in accordance with an embodiment of the present invention. FIG. 7 shows that the web site is categorized as "technology" and resolves to a domain located in the United States.

Figure 8:
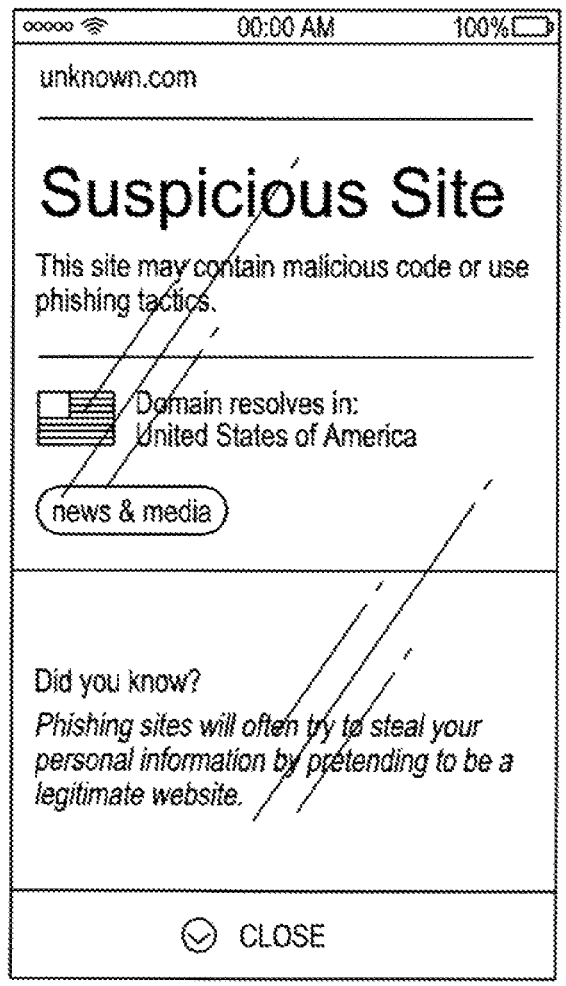
FIG. 8 is a screen shot of a threat level of "SUSPICIOUS" for a web site and a location of the web site, in accordance with an embodiment of the present invention.

Reference is made to FIG. 8, which is a screen shot of a threat level of "SUSPICIOUS" for the web site "unknown.com" displayed by warning generator 140B, including the nature of the "SUSPICIOUS" threat and a location of the web site, in accordance with an embodiment of the present invention. FIG. 8 shows that the threat is phishing malware that steals personal information, and that the web site is categorized as "news & media" and resolves to a domain located in the United States.

Figure 9:
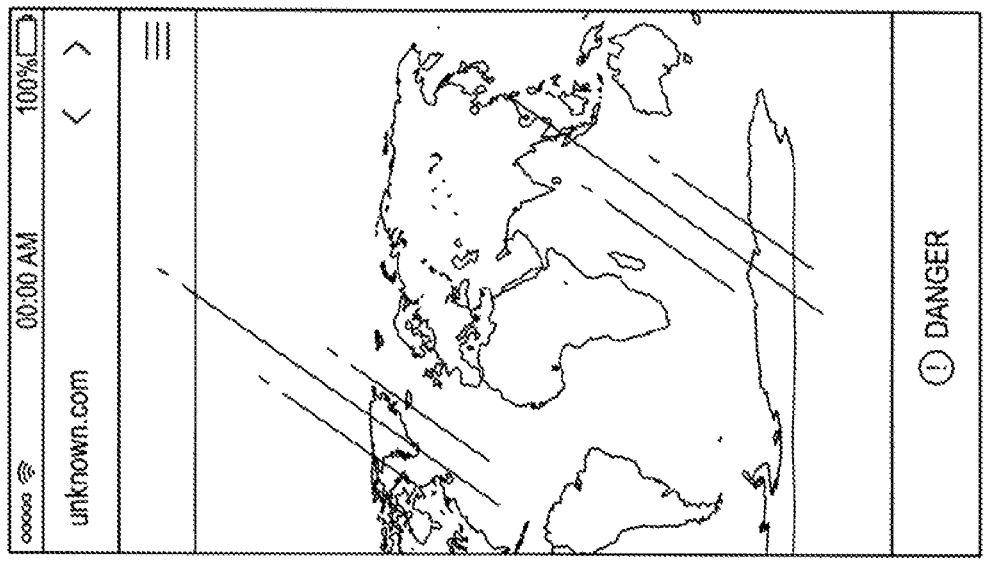
FIG. 9 is a screen shot of threat level of "DANGER" for a web site, in accordance with an embodiment of the present invention.

Reference is made to FIG. 9, which is a screen shot of a threat level of "DANGER" for the web site "unknown.com", in accordance with an embodiment of the present invention.

Figure 10:
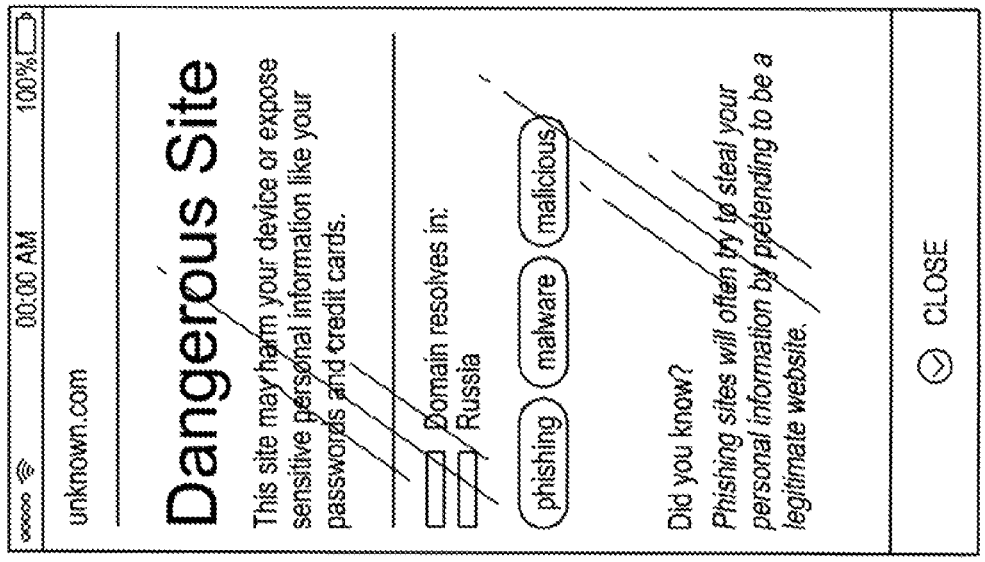
FIG. 10 is a screen shot of a warning including the nature of a "DANGEROUS" threat and a location of the web site, and a control to close the connection to the web site, in accordance with an embodiment of the present invention.

At operation 1052 the user requests more information about the nature of the threat. At operation 1056 warning generator 140B generates a second warning including the nature of the threat and the location of the identified web site. In this regard, reference is made to FIG. 10 which is a screen shot of a warning displayed by warning generator 140B, including the nature of the "DANGEROUS" threat and a location of the web site, and a control to close the connection to the web site, in accordance with an embodiment of the present invention. Specifically FIG. 10 shows that the threat is phishing malware that steals personal information, and that the web site is categorized as "phishing", "malware" and "malicious", and resolves to a domain located in Russia.

Figure 11:
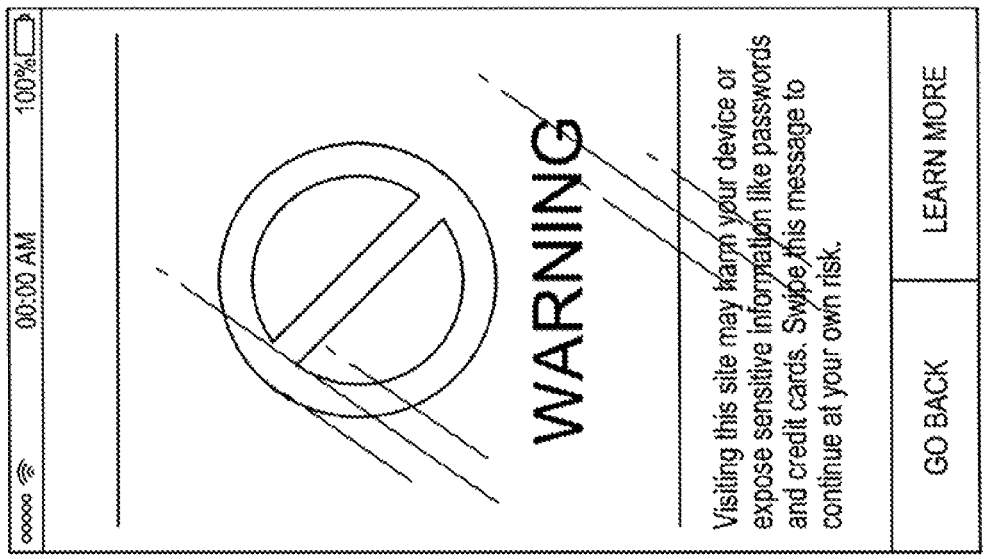
FIG. 11 is a screen shot showing a threat warning for a web page displayed by a processor, requiring a user to perform a swipe gesture in order to access a dangerous web site, in accordance with an embodiment of the present invention.

At operation 1060 the user requests access to content at the identified web site. If the requested content has a threat level of "DANGEROUS", then at operation 1064, warning generator 140C prompts the user to perform a confirmatory gesture, such as a swipe gesture. Such a prompt is shown in FIG. 11. Operation 1064 is performed only when the threat level of the identified web site is "DANGEROUS"; alternatively, operation 1064 may be performed when the threat level of the identified web site is either "SUSPICIOUS" or "DANGEROUS".

Reference is made to FIG. 11, which is a screen shot showing a threat warning for a web site displayed by warning generator 140C, requiring a user to perform a swipe gesture in order to access a dangerous web site, in accordance with an embodiment of the present invention. FIG. 11 shows a threat warning for the web site "unknown.com" displayed by warning generator 140C, in accordance with an embodiment of the present invention. The warning includes the text "WARNING" displayed with a caution sign, and a message indicating that accessing the identified web site may be harmful to device 100 or may compromise sensitive information of the user. The warning also provides touch controls for the user to "GO BACK" and not access the identified web site, or to "LEARN MORE" about the nature of the threat. If the user wishes nevertheless to access the identified web site, then the user is required to perform a swipe gesture on I/O module 120, to slide the warning message off of the display.

Figure 12:
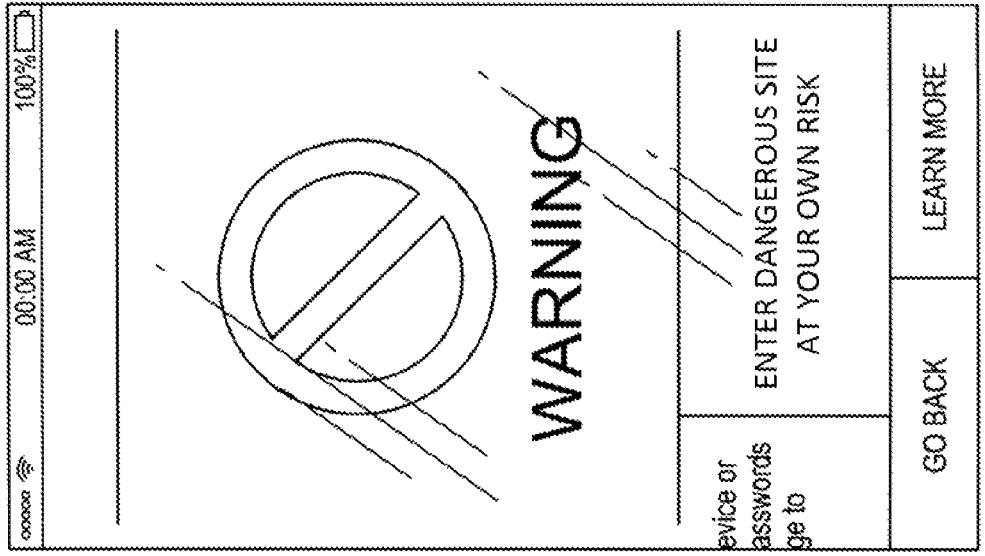
FIG. 12 is a screen shot of a swipe gesture being performed to access a dangerous web site, in accordance with an embodiment of the present invention.

At operation 1068 the user reviews the displayed message and decides nevertheless to perform the confirmatory gesture. In this regard, reference is made to FIG. 12, which is a screen shot of a swipe gesture being performed on I/O module 120 to access the dangerous web site, in accordance with an embodiment of the present invention. As the swipe gesture is being performed and the warning message slides out of the display, another message, "VISIT DANGEROUS SITE", slides into the display. As such, it will be appreciated by those skilled in the art that it is highly unlikely that the user access the identified web site unintentionally.

At operation 1072, in response to the user having performed the confirmatory gesture at operation 1068, web browser 130 attempts to access the identified web site. However, it may be that the identified web site redirects web browser 130 using a different identifier than that received at operation 1010. Client device 100 may register itself to listen to redirection events for web browser 130 and, as such, is able to hook web browser 130 before it accesses the different identifier. At decision 1076, client device 100 determines whether or not web browser 130 has been redirected. If so, processing returns to operation 1008, where client device 100 passes the different identifier to scan engine(s) 300 for analysis. Otherwise, if decision 1076 determines that web browser 130 has not been redirected, processing advances to operation 1080, where web browser 130 accesses the content that the user requested at operation 1060. The user then views and interacts with the content at operation 1084, thereby completing flowchart 1000.

In an alternative embodiment of the present invention, warning generator 140B of FIG. 1 may be eliminated and, correspondingly, method 1000 of FIG. 2 may advance directly from operation 1048 to operation 1060. As such, the tri-warning module, system and method of FIGS. 1 and 2 may optionally be a bi-warning module, system and method, respectively, without using the intermediate informational warnings, such as the warnings shown in FIGS. 7, 8 and 10. Instead, after displaying the threat level (first warning) of an identified web site at operation 1048, if the threat level is "DANGEROUS" the user is required to perform a confirmatory gesture in order to access the site (second warning) at operation 1068. To indicate this alternative embodiment, warning generator 140B is drawn with a dashed rectangle in FIG. 1, operations 1052 and 1056 are drawn with dashed rectangles in FIG. 2, and an arrow from operation 1048 to operation 1060 is drawn with a dashed line in FIG. 2.

There are many ways to classify malware threats based on scan results from scan engine(s) 300. Inter alia classification of malware threats by warning generator 140A into types "DANGEROUS", "SUSPICIOUS" and "SAFE" may be based on statistics of the virus scan results provided to warning generator 140A from scan engine(s) 300. In one exemplary embodiment, categorization may be based on statistical conditions such as those shown in TABLE I below.

TABLE I

Statistical breakdown of scan engine results into threat levels

| Threat Type | Condition |
| --- | --- |
| DANGEROUS | >75% of the scan engines indicate risk |
| SUSPICIOUS | 5%-75% of the scan engines indicate risk |
| SAFE | <5% of the scan engines indicate risk |

In another exemplary embodiment, the scan engine(s) 300 may provide their own results that can be mapped to the "DANGEROUS", "SUSPICIOUS" and "SAFE" trichotomy, and categorization may be based on statistical conditions such as those shown in TABLE II below.

TABLE II

Statistical breakdown of scan engine results into threat levels

| Threat Type | Condition |
| --- | --- |
| DANGEROUS | at least 2 of the scan engine results map to DANGEROUS, or 1 scan engine result maps to DANGEROUS and 1 scan engine result maps to SUSPICIOUS. |
| SUSPICIOUS | at least 2 of the scan engine results map to SUSPICIOUS. |
| SAFE | At most 1 of the scan engine results map to DANGEROUS or SUSPICIOUS. |

Those skilled in the art will appreciate that TABLES I and II are merely exemplary. The present invention anticipates other classifications based on scan results from scan engine(s) 300.

Figure 13:
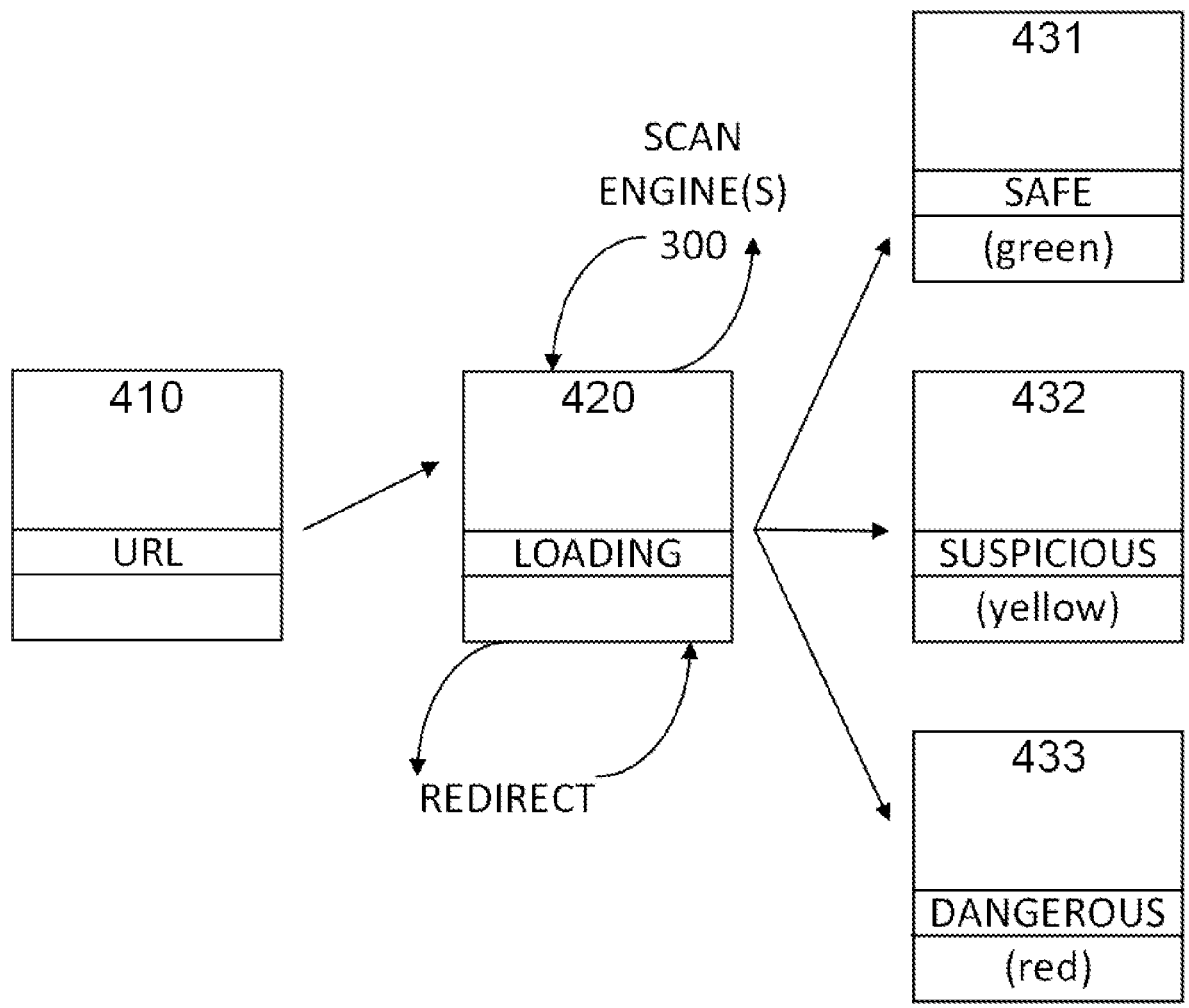
FIG. 13 is a simplified flow diagram using display screens to illustrate stages of a client-based malware warning mechanism, in accordance with an embodiment of the present invention.

Reference is made to FIG. 13, which is a simplified flow diagram using display screens to illustrate stages of a client-based malware warning mechanism, in accordance with an embodiment of the present invention. FIG. 13 includes virus scan engine(s) 300. Screen 410 is a landing screen, e.g., the screen shown in FIG. 3, prompting a user to enter a URL. Screen 420 is a loading screen, e.g., the screen shown in FIG. 4. While screen 420 is being displayed, warning generator 140A determines the security threat of the URL that was entered in screen 410. If security information for the URL is not readily available in URL database 150, then client device 100 queries scan engine(s) 300 for information about the URL. After determining the security threat, warning generator 140A displays either a "DANGEROUS" screen 431, e.g., the screen shown in FIG. 6, or a "SUSPICIOUS" screen 432, e.g., the screen shown in FIG. 8, or a "SAFE" screen 433, e.g., the screen shown in FIG. 10.

Client device 100 then performs the warning method of FIG. 2 beginning at operation 1055. Upon request by the user of information about the nature of the threat, warning generator 140B generates warning screens, such as the screens shown in FIGS. 7, 9 and 11, with warning information for the respective "DANGEROUS", "SUSPICIOUS" and "SAFE" threat levels.

If the user decides to access the content at the URL, then warning generator 140C requires that the user perform a confirmatory gesture, as shown in FIG. 11. Upon performing the confirmatory gesture, web browser 130 attempts to access the URL. If web browser 130 is re-directed to another URL, then client device 100 hooks the re-direction event and displays screen 420, prior to web browser 130 accessing the other URL.

Middleware Server-Based Embodiment

Figure 14:
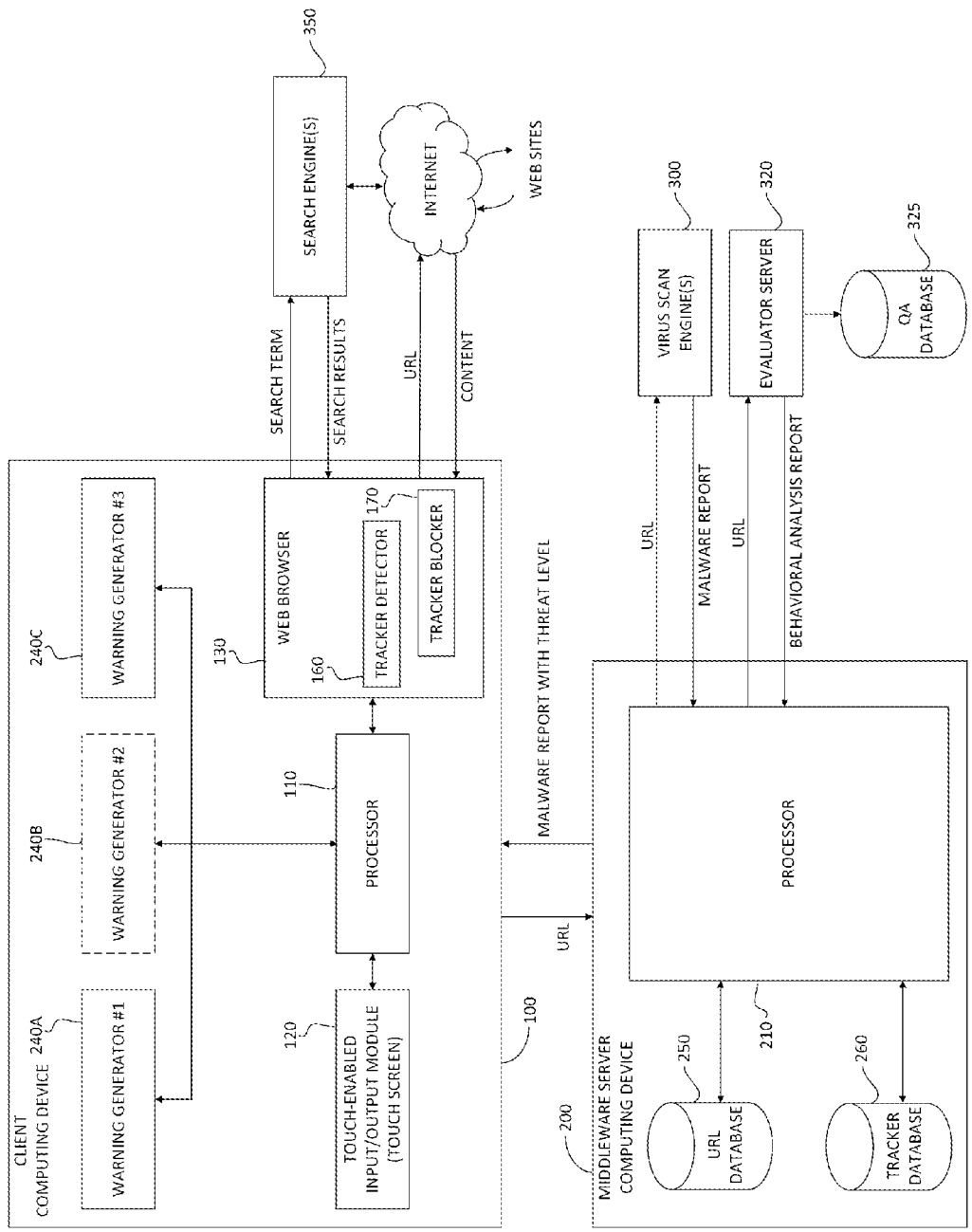
FIG. 14 is a simplified diagram of a middleware server-based embodiment of a malware warning system for URLs, in accordance with an embodiment of the present invention.

Reference is made to FIG. 14, which is a simplified diagram of a middleware server-based embodiment of a malware warning system for URLs, in accordance with an embodiment of the present invention. As shown in FIG. 14 middleware server 200 intermediates between client device 100 and scan engine(s) 300.

In an embodiment of the present invention, a client application on device 100 interacts with middleware server 200, transmitting URLs to middleware server 200 and receiving malware reports from middleware server 200. In another embodiment of the present invention, web browser 130 is itself configured to interact with middleware server 200.

It will be appreciated by those skilled in the art that a client-server architecture affords many variations in distribution of processing labor between the client and the server, all of which are contemplated by the present invention. Thus, comparing FIG. 14 to FIG. 1, in FIG. 14 middleware server 200, instead of client device 100, passes URLs to scan engine(s) 300 and to evaluator server 320. In alternative embodiments, however, middleware server 200, instead of client device 100, may pass URLs to the Internet, and/or may pass search terms to search engine 350. Similarly, one or more of the three warning generators 140A, 140B and 140C may be components of middleware server 200 instead of client device 100.

Middleware server 200 contains a URL database 250, which stores URLs and their scan results. URL database 250 may reside locally on middleware server 200, as shown in FIG. 14, or alternatively it may reside remote from middleware server 200.

Web browser 130 includes a tracker detector 160 that detects web page trackers, and a tracker blocker 170 that blocks web page trackers, and middleware server includes a tracker database 260 that stores known trackers. Operation of tracker blocker 160 and tracker blocker 170, and use of tracker database 260 is described below with reference to FIGS. 26-32.

Figure 15:
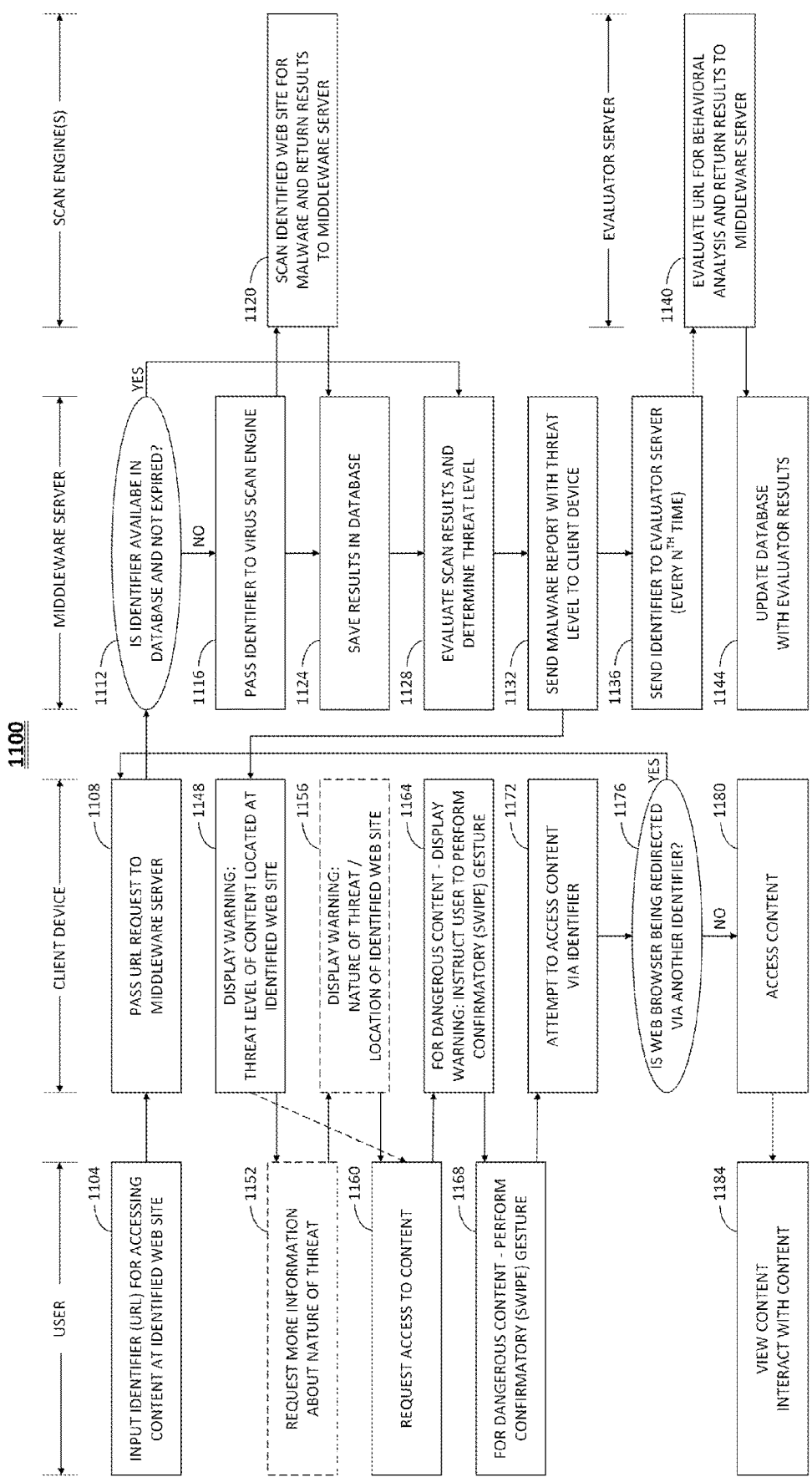
FIG. 15 is a simplified flowchart of a middleware server-based method for malware warning for URLs, in accordance with an embodiment of the present invention.

Reference is made to FIG. 15, which is a simplified flowchart 1100 of a middleware server-based method for malware warning for URLs, in accordance with an embodiment of the present invention. Flowchart 1100 of FIG. 15 is divided into four columns. The left-most column includes operations performed by a user of client device 100, the second-from-leftmost column includes operations performed by client device 100, the second-from rightmost column indicates operations performed by middleware server 200, and the rightmost column, at the top, includes operations performed by scan engine(s) 300 and, at the bottom, includes operations performed by evaluator server 320.

At operation 1104, the user enters an identifier, such as a URL, for accessing content at a web site identified by the identifier. At operation 1108, client device 100 passes the identifier to middleware server 200 for analysis, thereby relieving client device 100 from this task. At decision 1112, middleware server 200 consults URL database 250 to determine if information about the URL already resides in URL database 250, and if this information has not expired. An expiration date, e.g., 30 days, is pre-configured, so as to force re-scans of URLs after a time period. If decision 1112 is affirmative, then method 1100 advances to operation 1128. Otherwise, if decision 1112 is negative, then at operation 1116 middleware server 200 passes the identifier to scan engine(s) 300 for analysis.

At operation 1120, scan engine(s) 300 scan the identified content for potential malware, and return scan results to middleware server 200. At operation 1124, middleware server 200 saves the scan results in URL database 250. At operation 1128, middleware server 200 evaluates the scan results that it received from scan engine(s) 300, and determines a threat level of the identified content. E.g., in one embodiment of the present invention, there are three threat levels; namely, "SAFE", "SUSPICIOUS" or "DANGEROUS". Determination of threat level may be based on statistics of the scan results, as described hereinabove with reference to TABLES I and II. At operation 1132, middleware server 200 passes a malware including the threat level to client device 100.

At operation 1136, middleware server 200 sends the identifier to evaluator server 320 at each $N^{th}$ pass through operation 1136; e.g., at each $4^{th}$ pass. Operation of evaluator server 320 is described below with reference to FIG. 21. At operation 1140 evaluator server 320 performs a behavioral analysis for the content identified by the URL, and returns its results to middleware server 300. At operation 1144, middleware server 200 updates the URL database 250 with the results it receives from evaluator server 320.

Subsequent operations 1148-1184 are similar to correspondingly numbered operations 1048-1084, which are described above with reference to FIG. 2.

Figure 16:
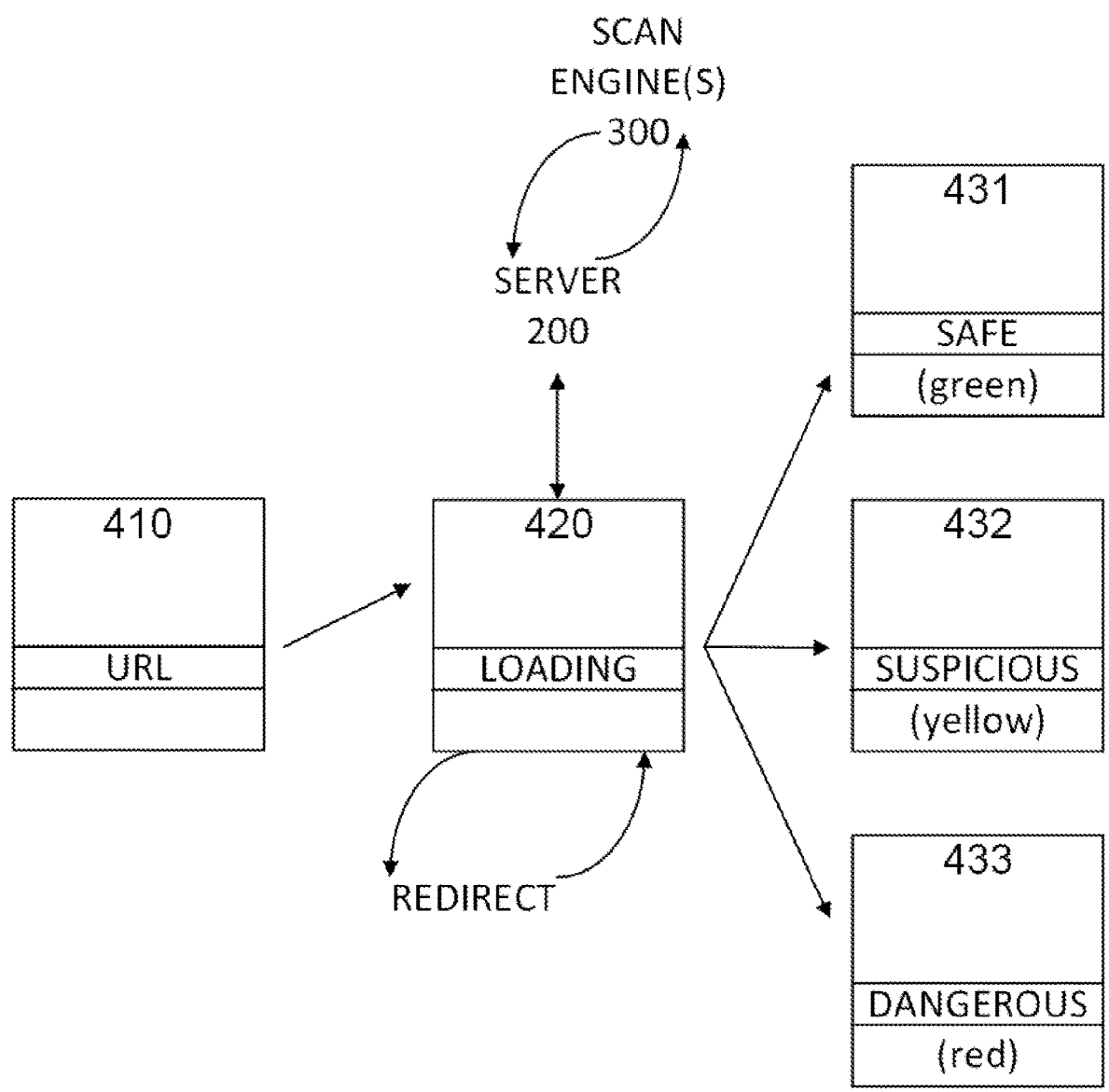
FIG. 16 is a simplified flow diagram using display screens to illustrate stages of a middleware server-based malware warning mechanism, in accordance with an embodiment of the present invention.

Reference is made to FIG. 16, which is a simplified flow diagram using display screens to illustrate stages of a middleware server-based malware warning mechanism, in accordance with an embodiment of the present invention. FIG. 16 includes middleware server 200 and scan engine(s) 300. Screen 410 is a landing screen, e.g., the screen shown in FIG. 3, prompting a user to enter a URL. Screen 420 is a loading screen, e.g., the screen shown in FIG. 4. While screen 420 is being displayed, device 100 sends the URL that was entered in screen 410 to middleware server 200 for analysis. If security information for the URL is not readily available to middleware server 200 in URL database 250, or if the information is available but out-of-date, then middleware server 200 queries scan engine(s) 300 for information about the URL. After client device 100 receives a threat level for the URL from middleware server 200, warning generator 140A displays either a "SAFE" screen 431, e.g., the screen shown in FIG. 6, or a "SUSPICIOUS" screen 432, e.g., the screen shown in FIG. 8, or a "DANGEROUS" screen 433, e.g., the screen shown in FIG. 10, based on the threat level of the identified content.

Client device 100 then performs the warning method of FIG. 16 beginning at operation 1156. Optionally, upon request by the user of information about the nature of the threat, warning generator 140B generates warning information, such as the information shown in FIGS. 7, 8 and 10 for the respective "SAFE", "SUSPICIOUS" and "DANGEROUS" threat levels.

If the user decides to access the content at the URL, and if that content has a threat level of "DANGEROUS", then warning generator 140C requires that the user perform a confirmatory gesture. Upon performing the confirmatory gesture, web browser 130 attempts to access the URL. If web browser is re-directed to another URL, then client device 100 hooks the re-direction event, and reports the re-direction event to middleware server 200, which then analyzes the other URL.

Figure 17:
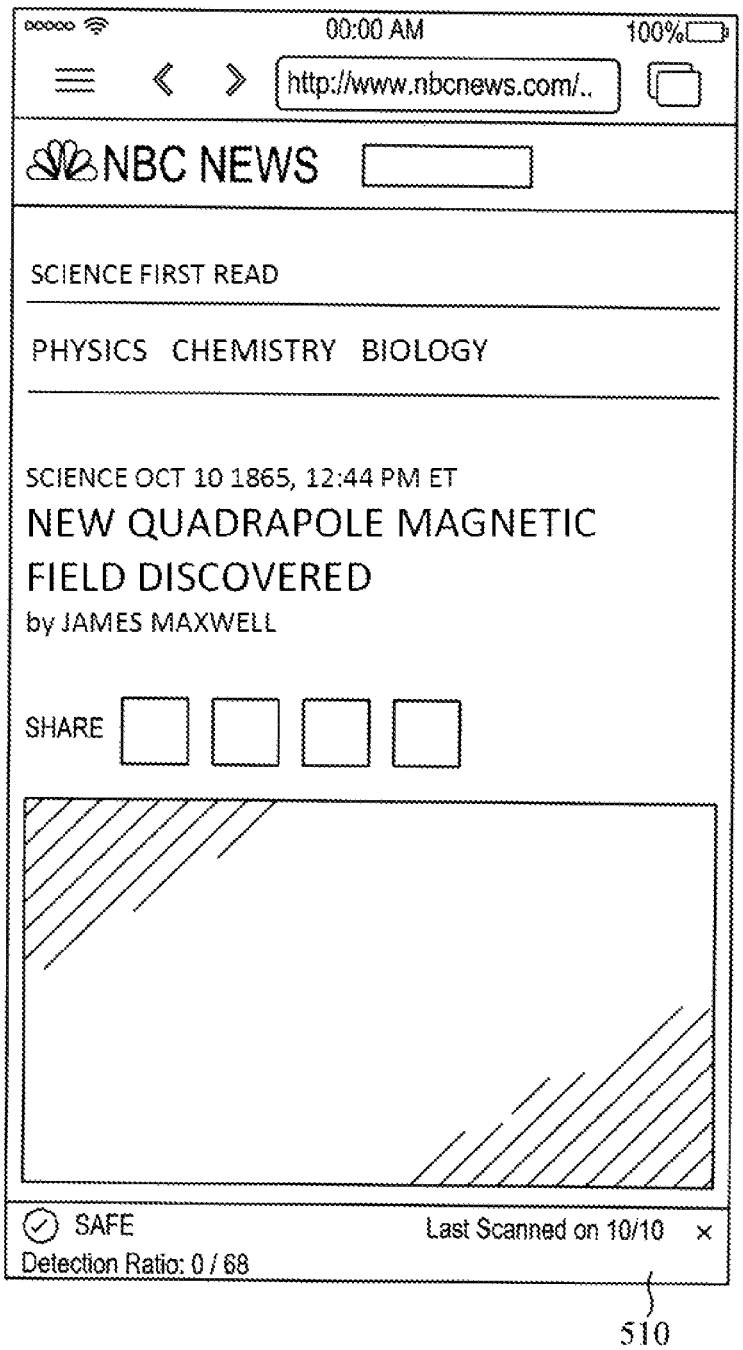
FIG. 17 is a screen shot of a "SAFE" web page with a scan results alert bar providing security evaluation information, displayed at the bottom of the page, in accordance with an embodiment of the present invention.

Reference is made to FIG. 17, which is a screen shot of a "SAFE" web page with a scan results alert bar 510 providing security evaluation information, displayed at the bottom of the page, in accordance with an embodiment of the present invention. When a page is loaded, scan results alert bar 510 is displayed and remains displayed for a pre-configured amount of time. In accordance with an embodiment of the present invention, by pressing on results alert bar 510 the user is able to request display of the complete scan results for the URL.

Figure 18:
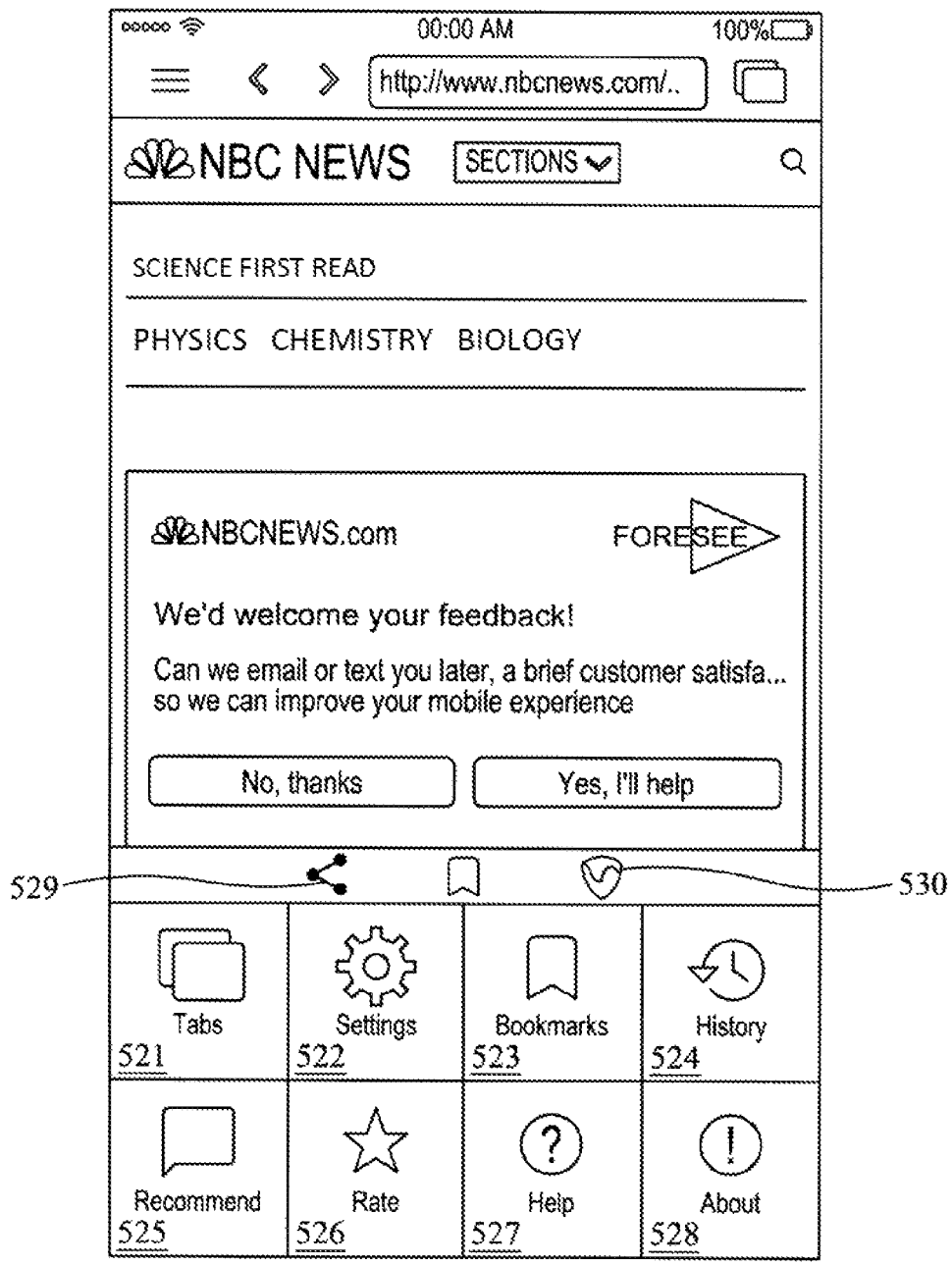
FIG. 18 is a screen shot of a web page with interactive browser controls displayed below, in accordance with an embodiment of the present invention.
Figure 19:
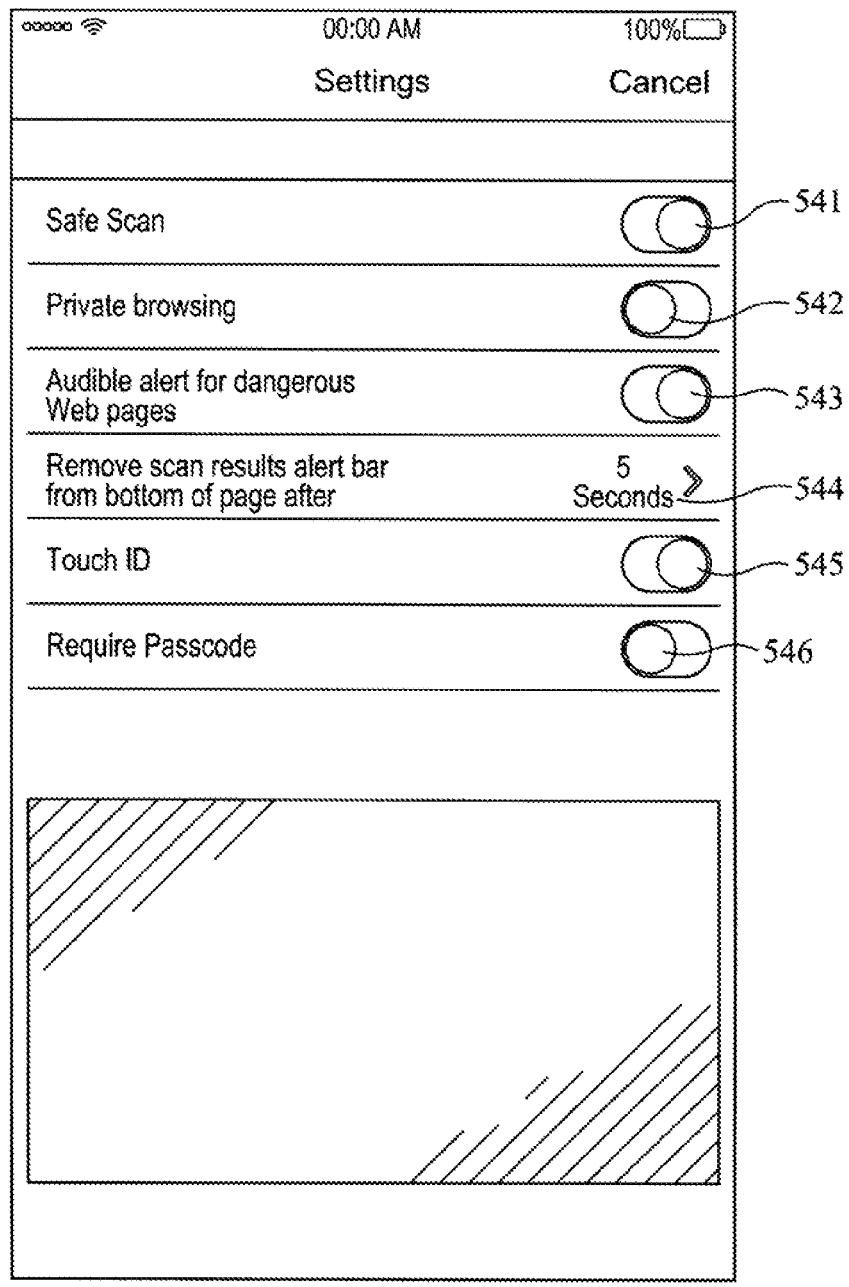
FIG. 19 is a screen shot of configuring security settings for a secure web browser, in accordance with an embodiment of the present invention.

Reference is made to FIG. 18, which is a screen shot of a web page with interactive browser controls displayed below, in accordance with an embodiment of the present invention. FIG. 18 shows a control 521 for tabbing through URL pages, a control 522 for configuring settings, a control 523 for bookmarking a currently active URL page and opening a bookmarked page, a control 524 for viewing and accessing a browsing history, a control 525 for recommending a currently active URL page, a control 526 for rating a currently active URL page, a control 527 for help, a control 528 for information about a browser that is currently being used, and a control 529 for sending the currently active URL page. FIG. 19 also shows a control 530 for forcing an immediate scan of a currently active URL page.

Reference is made to FIG. 19, which is a screen shot of configuring security settings for a secure web browser, in accordance with an embodiment of the present invention. FIG. 19 shows a setting 541 for turning the URL scanning on and off. FIG. 19 also shows a setting 542 for turning on and off private browsing; i.e., browsing without storing a history log. When private browsing is turned on, and a user attempts to set a bookmark, the user is asked to confirm that he wishes to set the bookmark since it will leave a history of a web site that he visited.

FIG. 19 also shows a setting 543 for turning on and off an audible alert for dangerous web pages. FIG. 19 also shows a control 544 for configuring an amount of time that scan results bar 510 (FIG. 17) remains displayed. FIG. 19 also shows a setting 545 for turning touch identification on and off. FIG. 19 also shows a setting 546 for turning passcode protection on and off.

URL Behavioral Analysis

Figure 20:
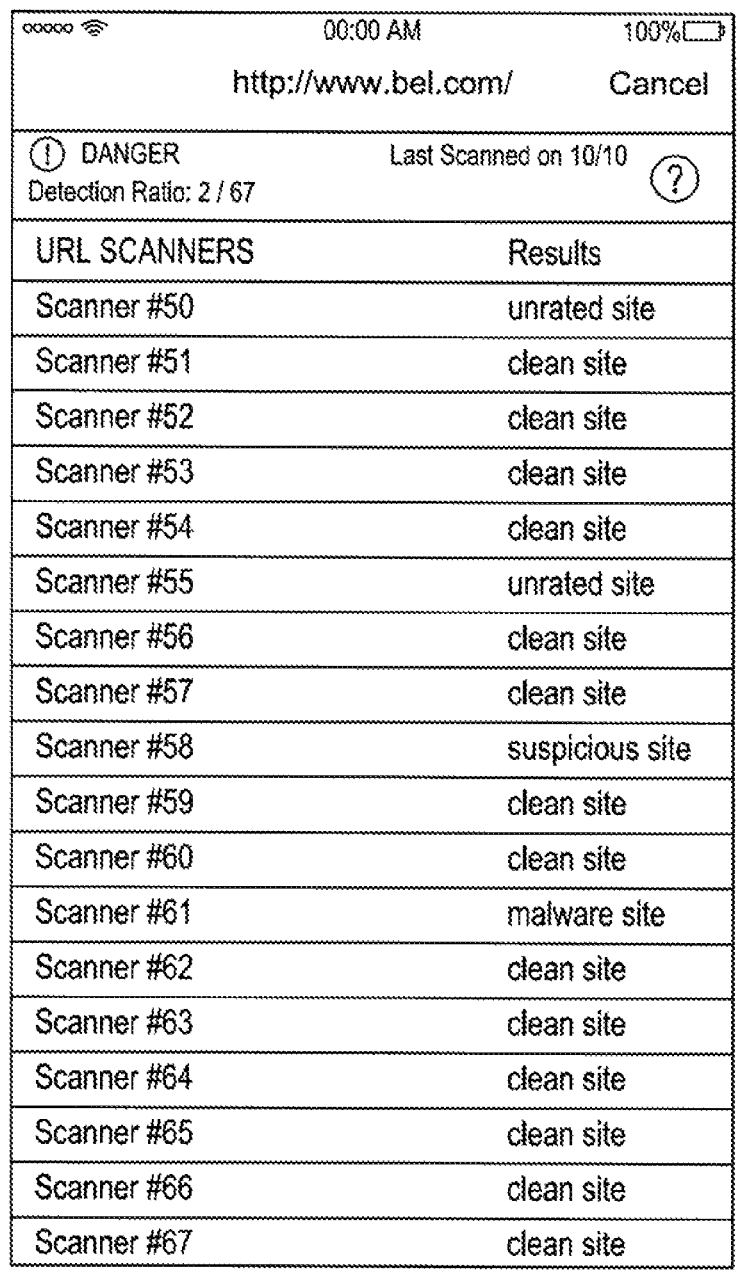
FIG. 20 is a screen shot of aggregate pass/fail scan results from a plurality of different scanners, in accordance with an embodiment of the present invention.

Scan engine(s) 300 may provide only pass/fail information, or grade/rating information indicating a level of risk for URL content. Reference is made to FIG. 20, which is a screen shot of aggregate scan results from a plurality of different scanners, in accordance with an embodiment of the present invention.

In distinction, evaluator server 320 performs script behavioral analysis and provides security profile data including a list of suspicious operations performed by a URL web page. However, such analysis is more time-consuming that the scans performed by scan engine(s) 300, and it is generally unfeasible for a browser to perform such analysis in-line, since the longer response time for loading and displaying URL content to a user would overburden and frustrate the user.

Instead, embodiments of the present invention provide behavioral analysis off-line, non-synchronous with scan engine(s) 300, so as not to interfere with the user's browsing experience. The results of the behavioral analysis are stored in QA database 325, and provided to the user or to an administrator automatically, or upon request.

Figure 21:
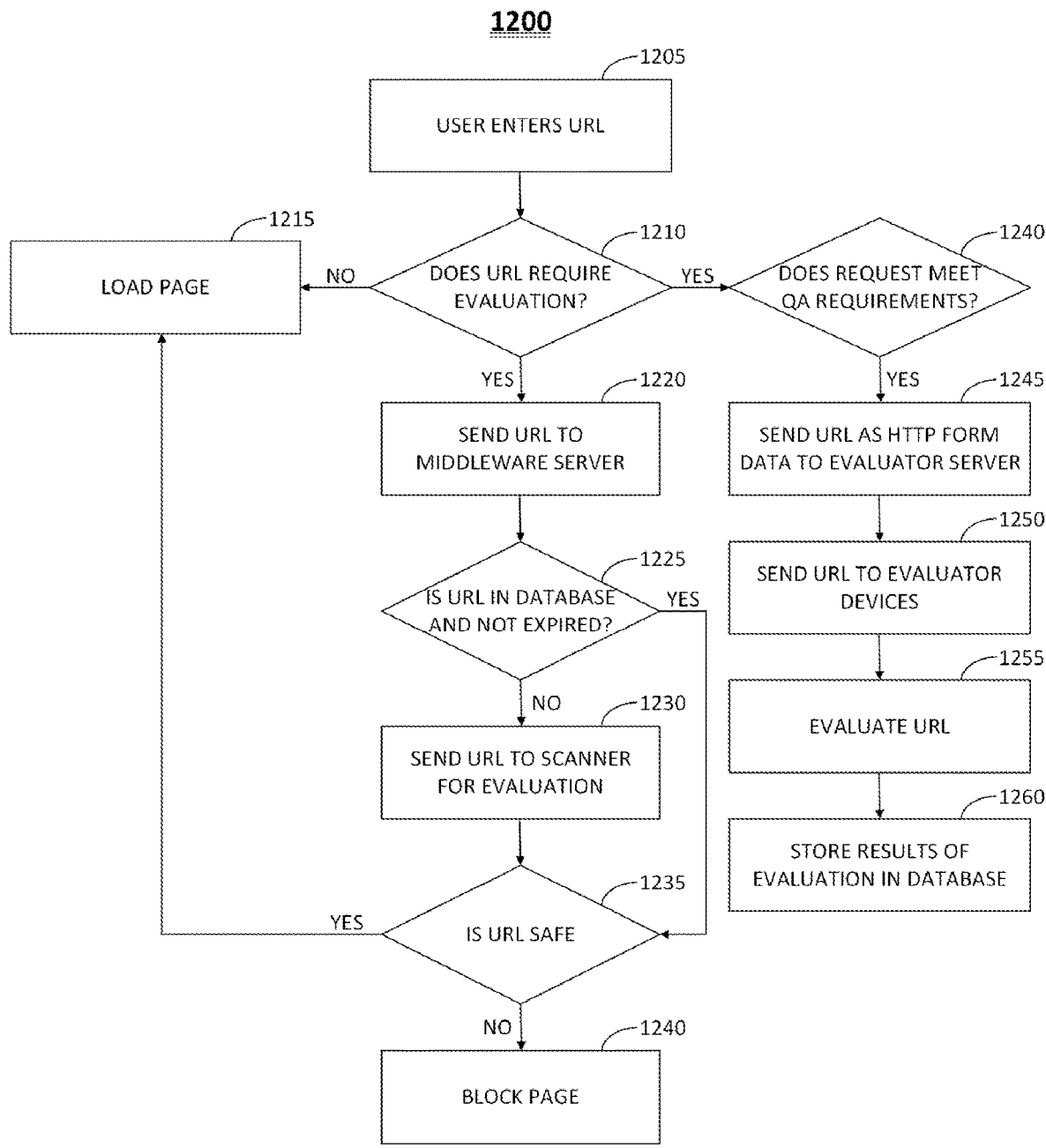
FIG. 21 is a simplified flowchart of a URL evaluation method, in accordance with an embodiment of the present invention.

Reference is made to FIG. 21, which is a simplified flowchart of a URL evaluation method 1200, in accordance with an embodiment of the present invention. At operation 1205, a user enters a URL as input to client device 100. Alternatively, client device 100 may receive a URL from search engine(s) 350 in response to one or more search terms entered by the user. At decision 1210, a determination is made whether the URL requires evaluation. Inter alia the determination at operation 1210 may be made by checking if the URL is listed in a "black list" of potentially malicious URLs, in which case the URL is deemed to require evaluation. Alternatively, the determination at operation 1210 may be made by checking if the URL is listed in a "white list" of trusted URLs, in which case the URL is deemed to not require evaluation. Yet alternatively, a URL may be deemed to not require evaluation if the URL is in a browsing history, and has been there for the past N days, where N is a pre-configured number.

If it is determined at decision 1210 that the URL does not require evaluation, then at operation 1215 the content linked to by the URL is loaded into client device 100. Otherwise, if it is determined at operation 1210 that the URL does require evaluation, then at operation 1220 the URL is sent to a middleware server such as middleware server 200.

At decision 1225 the middleware server determines if the URL resides in URL database 250, which stores URLs and their scan results, and if the URL information has not expired. If it is determined at decision 1225 that the URL does not reside in URL database 250 or that the URL does reside in URL database 250 but its information has expired, then at operation 1230 the URL is sent to a security scanner for security evaluation. At decision 1235 a determination is made whether or not the URL is safe. If it is determined at operation 1235 that the URL is safe, then control proceeds to operation 1215 where the content linked to by the URL is loaded into client device 100. Otherwise, if it is determined at decision 1235 that the URL is not safe, then the URL is blocked at operation 1240.

If it is determined at operation 1225 that the URL does reside in URL database 250 and its information has not expired, then control proceeds directly from operation 1225 to operation 1235, bypassing the scan at operation 1230. It will be appreciated by those skilled in the art that bypassing the scan eliminates time-consuming processing, and accelerates method 1200. It will be further appreciated by those skilled in the art that URL database 250 may be configured to delete old URLs that have not been recently scanned, e.g., URLs that have not been scanned within the past 30 days, in order to cause method 1200 to re-scan such URLs.

Returning to operation 1210, if it is determined at operation 1210 that the URL does require evaluation, then at operation 1240 a determination is made whether one or more quality assurance (QA) sample check criteria are met. E.g., every $4^{th}$ URL may be selected for QA testing; alternatively, selection may be random. If it is determined at operation 1240 that the one or more QA criteria are met, then at operation 1245 the URL is sent to evaluator server 320 as HTTP form data, for performance of behavioral analysis on the URL page.

At operation 1250 the evaluator server sends the URL to one or more evaluator devices. At operation 1255 the one or more evaluator devices evaluate behavior of the URL content, e.g., by deriving a list of suspicious operations performed by the URL content. At operation 1260 the results of the evaluation are stored in URL database 250. Optionally, the results of the evaluation may be stored in QA database 325, for access by an administrator. Operations 1240-1260 ensure that the behavior analysis by evaluator server 330 and storing of behavior information in URL database 250 are performed separate from the scanning for risk assessment at operation 1230, thus avoiding any degradation of the user's web browsing experience.

Malware Warnings for Search Results

It will be appreciated by those skilled in the art that the warning modules, systems and methods of the present invention are of widespread advantage to many client-server applications. In some embodiments, the present invention is applied to search engines, to provide warning modules, systems and methods for potential malware in web search results. These applications may be embodied inter alia with or without use of a middleware server computer.

Figure 22:
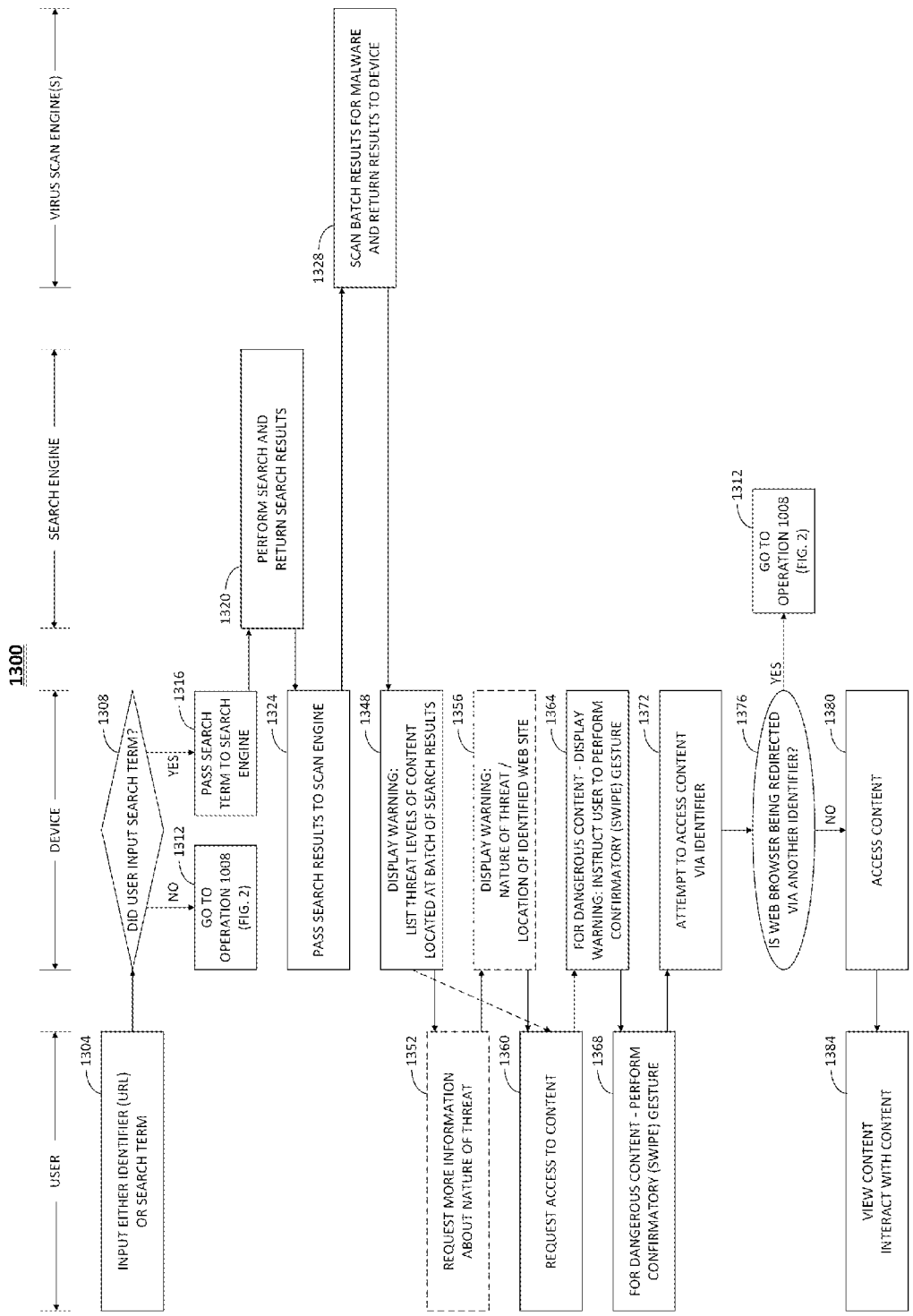
FIG. 22 is a simplified flowchart of a client-based method for malware warning for search results, in accordance with an embodiment of the present invention.

Reference is made to FIG. 22, which is a simplified flowchart 1300 of a client-based method for malware warning for search results, in accordance with an embodiment of the present invention. Flowchart 1300 of FIG. 22 is divided into four columns. The leftmost column includes operations performed by a user, the second-from-leftmost column includes operations performed by client device 100, the second-from rightmost column indicates operations performed by search engine(s) 350, and the rightmost column includes operations performed by scan engine(s) 300.

At operation 1304, the user enters either an identifier, such as a URL, or a search term. At decision 1308, client device 100 determines whether or not the user entered a search term. For example, client device 100 may examine the text string input by the user for the presence of a domain name extension such as ".com". If decision 1308 determines that the user did not enter a search term, then the user input is an identifier, and at operation 1312 flowchart 1200 advances to operation 1008 of FIG. 2; namely, a method for malware warning for identifiers.

If decision 1308 determines that the user entered a search term, then at operation 1316 client device 100 passes the search term to search engine(s) 350. At operation 1320 search engine(s) 350 perform the requested search and return their search results to client device 100. At operation 1324 client device 100 in turn passes a batch of the search results to scan engine(s) 300, for inspection of each result for potential malware. Search results are sent to scan engine(s) 300 in batches, since there may be a large number of results, and it is not necessary for client device 100 to wait for scan engine(s) 300 to scan all of the results before presenting some of the results to the user. Each batch may be inter alia a display page worth of results. At operation 1328 scan engine(s) 300 analyze the batch of search results and return their results to client device 100.

Figure 23:
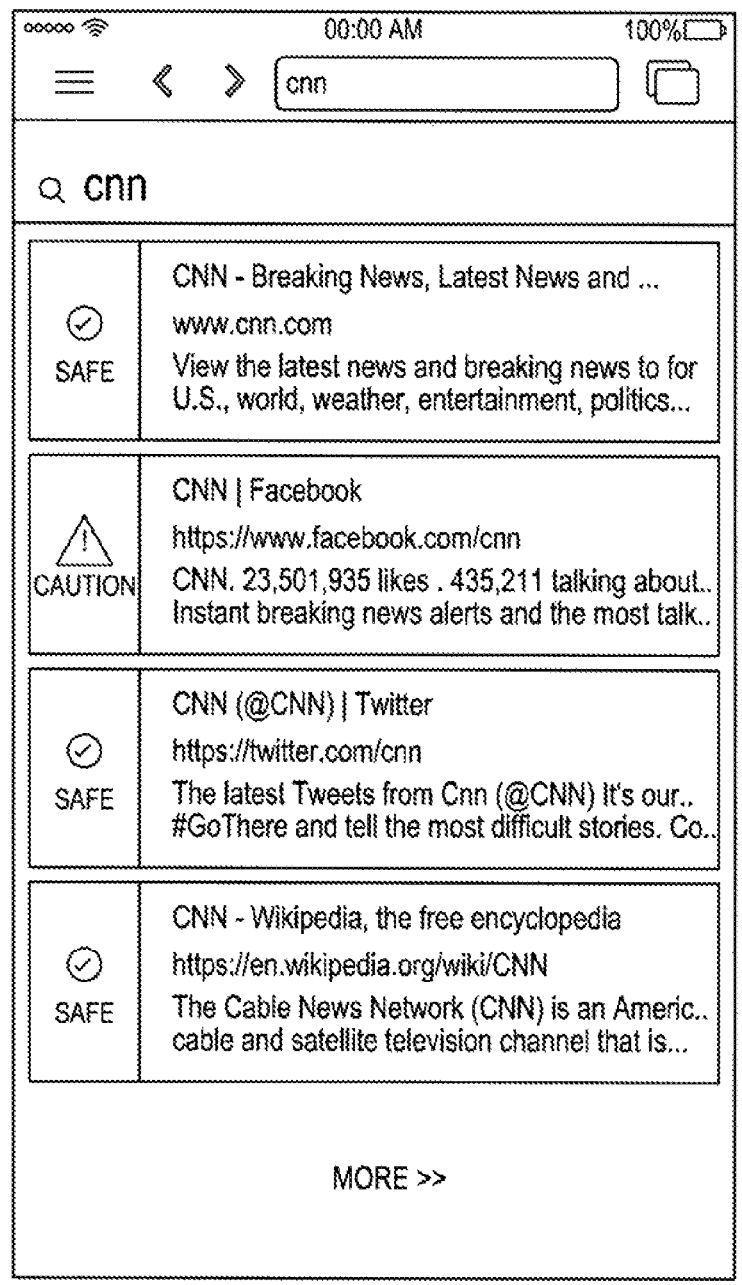
FIG. 23 is a screen shot of a warning regarding potential risks of search results in accordance with an embodiment of the present invention.

At operation 1348, warning generator 140A determines the threat levels of the search result content, e.g., "SAFE", "SUSPICIOUS" or "DANGEROUS"; and displays a list of the search results in the batch together with the threat levels of content located at each result. Reference is made to FIG. 23, which is a screen shot of a warning regarding potential risks of search results in accordance with an embodiment of the present invention.

At operation 1352, the user optionally requests more information about the nature of the threat for one or more of the search results in the list; e.g., the result marked "CAUTION" in FIG. 23. At operation 1356, warning generator 140B displays information about the nature of the threat and/or the location of the one or more search results.

At operation 1360, after having seen the information displayed by warning generator 140B, the user requests access to one of the search results. At operation 1364, warning generator 140C displays a warning instructing the user to perform a confirmatory gesture, such as a swipe gesture, to confirm his request, for results that have a threat level of "DANGEROUS". At operation 1368, the user performs the confirmatory gesture.

At operation 1372, in response to the user having performed the confirmatory gesture at operation 1368, web browser 130 attempts to access the requested search result. However, it may be that the requested search result redirects web browser 130 to a different web site. Client device 100 may register itself to listen to redirection events for web browser 130 and, as such, is able to hook web browser 130 before it accesses the different web site. At decision 1376, client device 100 determines whether or not web browser 130 has been redirected. If so, processing returns to operation 1008 of FIG. 2, where client device 100 passes an identifier for the redirected web site to scan engine(s) 300 for analysis. Otherwise, if decision 1376 determines that web browser 130 has not been redirected, processing advances to operation 1380, where web browser 130 accesses the content that the user requested at operation 1360. The user then views and interacts with the content at operation 1384, thereby completing flowchart 1300.

Figure 24:
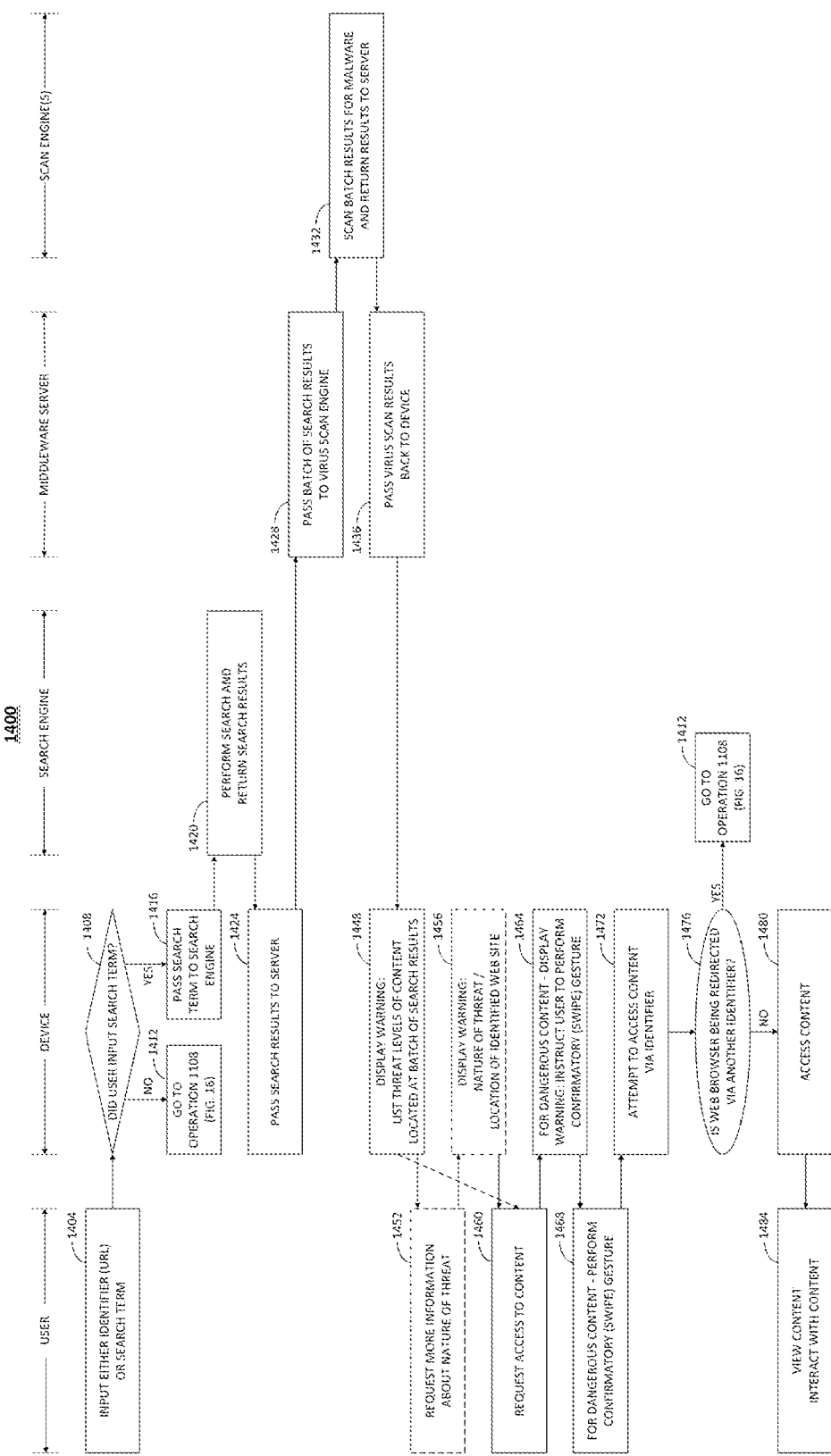
FIG. 24 is a simplified flowchart of a middleware server-based method for malware warning for search results, in accordance with an embodiment of the present invention.

Reference is made to FIG. 24, which is a simplified flowchart 1400 of a middleware server-based method for malware warning for search results, in accordance with an embodiment of the present invention. The flowchart of FIG. 24 is divided into five columns. The leftmost column indicates operations performed by a user, the second-from-leftmost column indicates operations performed by client device 100, the middle column indicates operations performed by search engine(s) 350, the second-from-rightmost column indicates operations performed by middleware server 200, and the rightmost column indicates operations performed by scan engine(s) 300.

At operation 1404 the user enters either an identifier for web content, or a search term. At decision 1408 client device 100 determines whether or not the user entered a search term. Decision 1408 may be performed as described above with reference to decision 1308 of FIG. 23. If decision 1408 determines that the user did not enter a search term, then at operation 1412 flowchart 1400 advances to operation 1108 of FIG. 15; namely, a method for malware warning for identifiers.

Otherwise, if decision 1408 determines that the user did enter a search term, then at operation 1416 device 100 passes the search term to search engine(s) 350. At operation 1420 search engine(s) 350 perform their search and return their search results to device 100. At operation 1424 client device 100 receives the search results, but prior to displaying them to the user, client device 100 passes a batch of the search results to middleware server 200 for a malware check.

At operation 1428 middleware server 200 passes the batch of search results to scan engine(s) 300 for scanning. At operation 1432, scan engine(s) 300 scan the batch of search results, and return scan results to middleware server 200. At operation 1436 middleware server 200 determines the threat level of each search result based on the scan results received from scan engine(s) 300, and passes malware reports with the threat levels back to client device 100.

Subsequent operations 1448-1484 are similar to correspondingly numbered operations 1348-1384 of FIG. 22.

In accordance with an alternative embodiment of the present invention, middleware server 200, instead of client device 100, passes the search terms to search engine(s) 350. In this case, instead of operation 1424, namely, client device 100 passing the search results to middleware server 200 subsequent to operation 1420, instead client device 100 instead passes the search terms to middleware server 200 prior to operation 1420, and then middleware server 200 passes the search results to search engines(s) 350 and receives the search results from search engine(s) 350.

Figure 25:
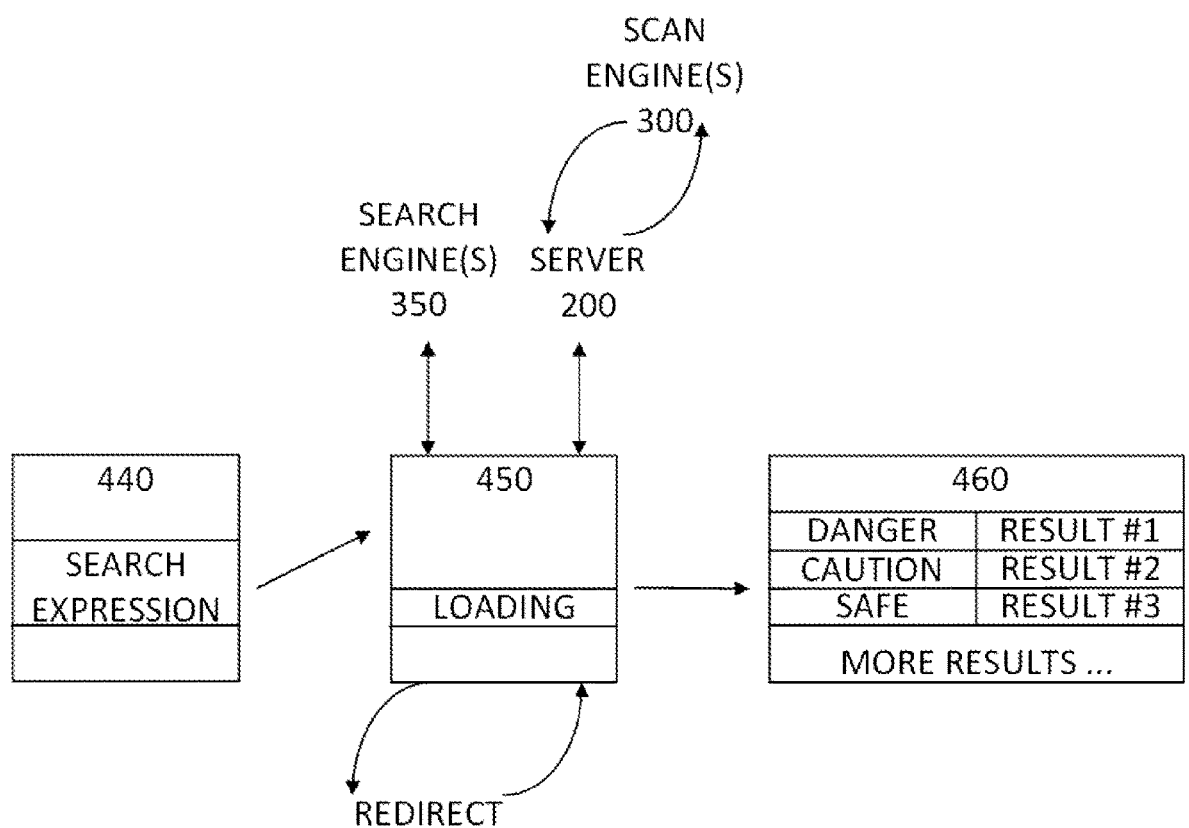
FIG. 25 is a simplified flow diagram using display screens to illustrate stages of a middleware server-based malware warning mechanism for web search results, in accordance with an embodiment of the present invention.

Reference is made to FIG. 25, which is a simplified flow diagram using display screens to illustrate stages of a middleware server-based malware warning mechanism for web search results, in accordance with an embodiment of the present invention. FIG. 25 includes middleware server 200, scan engine(s) 300 and search engine(s) 350. Screen 440 is a landing screen, prompting a user to enter a search expression. Screen 450 is a loading screen. While screen 450 is being displayed, client device 100 sends the search expression that was entered in screen 410 to search engine(s) 350. After receiving a page of search results, client device 100 sends the results to middleware server 200, which sends the URLs of the search results to scan engine(s) 300 for analysis. Middleware server 200 determines the threat levels of the search results based on the scan results, and returns malware reports including the threat levels to client device 100. Warning generator 140A displays a list of results together with their levels of threat, as shown in screen 460.

If the user touches one of the results to request information about the nature of the threat, then client device 100 performs the warning method of FIG. 2 beginning at operation 1056, and warning generator 140B generates warning information, such as the information shown in FIGS. 7, 8 and 10 for the respective "SAFE", "SUSPICIOUS" and "DANGEROUS" threat levels.

Thus it will be appreciated by those skilled in the art that the present invention prevents a "one touch too late" catastrophe and ensures that a user does not access suspect malware unintentionally, by provide multiple warnings about specific malware that a user is encountering, and by requiring a confirmatory action from the user that is different than a simple touch, prior to accessing a suspicious web site, application or file. The present invention has widespread application to malware protection for computing devices that receive data over a network.

It will be appreciated by those skilled in the art that there are many apparent variations of the modules, systems and methods described above. The operations in the flowcharts of FIGS. 2, 15, 21, 22 and 24 may be performed in a different order than that shown in the flowcharts. For example, referring to FIG. 15, the middleware server may perform operations 1136 and 1144 prior to performing operations 1128 and 1132, or between performance of operations 1128 and 1132.

Tracker Detection and Blocking

Embodiments of the present invention provide a user who is browsing a web page with an option to selectively block trackers in the web page, if he prefers not to be tracked by certain trackers. The user's browser presents the user with a display of trackers detected in the web page, and presents on/off controls enabling the user to turn one or more of the displayed trackers on and off. When the user turns off one or more of the display trackers, the web page is reloaded without those trackers that the user turned off.

Figure 26:
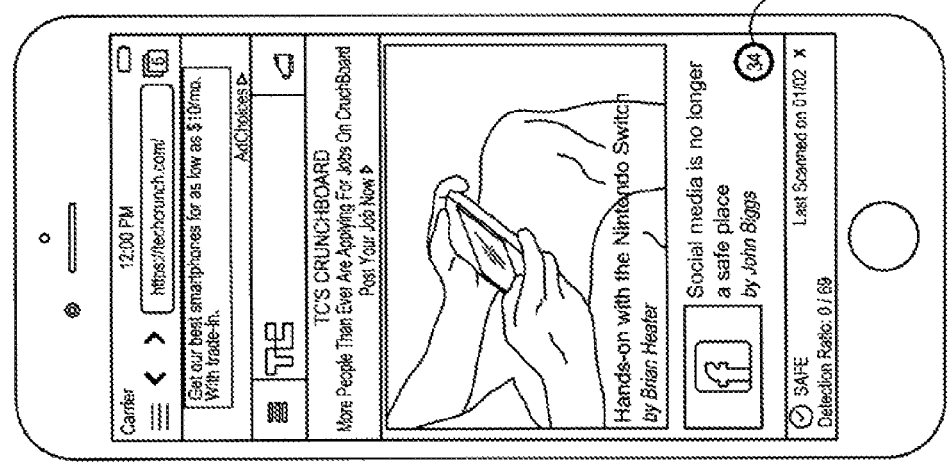
FIG. 26 is a screen shot of a web page with tracker detection, in accordance with an embodiment of the present invention.

Reference is made to FIG. 26, which is a screen shot of a web page with tracker detection, in accordance with an embodiment of the present invention. The web page includes trackers, and a control 610 indicates that 34 trackers have been detected in the web page.

Figure 27:
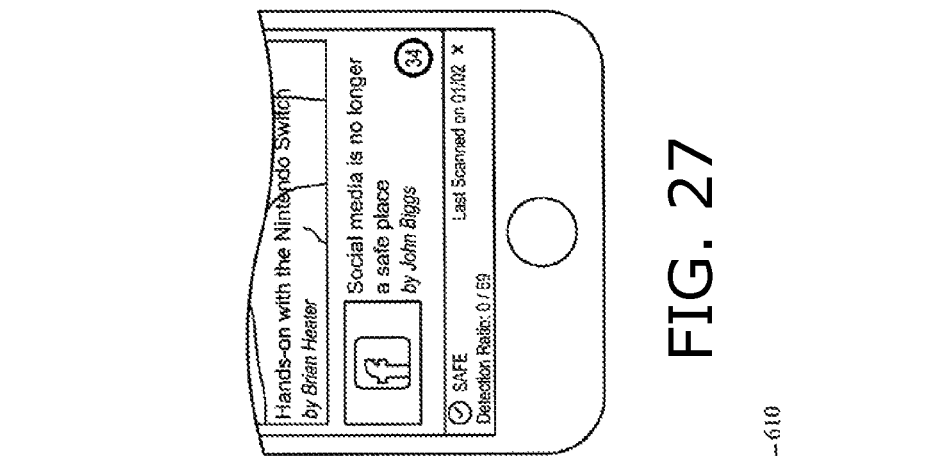
FIG. 27 is a screen shot of a message about trackers that is overlaid on the web page of FIG. 26, in accordance with an embodiment of the present invention.

Reference is made to FIG. 27, which is a screen shot of a message about trackers that is overlaid on the web page of FIG. 26, in accordance with an embodiment of the present invention. The message instructs a user to press on control 610 to see a list of the trackers.

Figure 28:
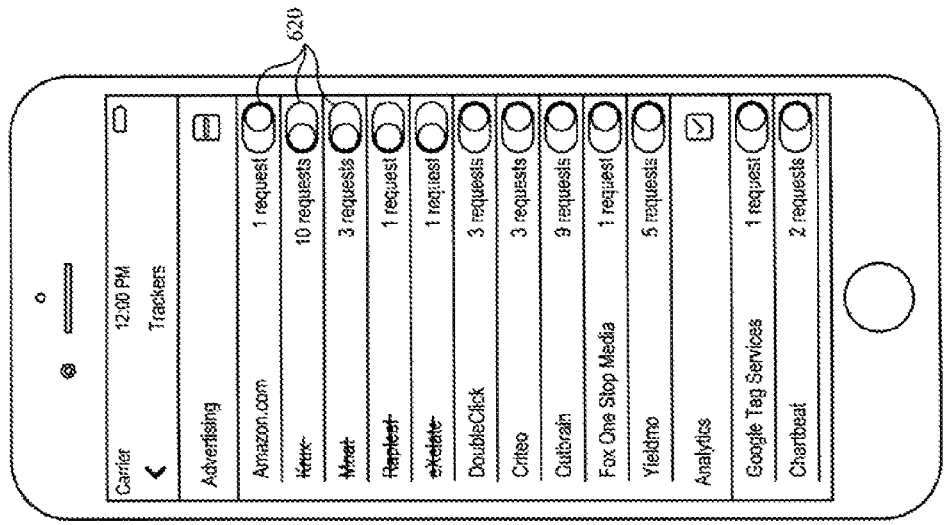
FIG. 28 is a screen shot of a list of trackers that are detected in the web page of FIG. 26, in accordance with an embodiment of the present invention.

Reference is made to FIG. 28, which is a screen shot of a list of trackers that are detected in the web page of FIG. 26, in accordance with an embodiment of the present invention. The list includes advertising trackers including Amazon.com, and analytics trackers including Google Tag services. The list is displayed in response to a user pressing control 610. The trackers are categorized into categories including (i) advertising trackers, (ii) analytics trackers, (iii) content trackers, and (iv) social trackers. Alongside each listed tracker is an on/off control 620 for selectively blocking the tracker. Those trackers selected to block, namely, Krux, Moat, Rapleaf, etc., are displayed with strikethrough text.

Reference is made to FIG. 29, which is a screen shot of a web page with tracker detection, before trackers are blocked, in accordance with an embodiment of the present invention. The web page includes advertisements, and control 610 shows that 39 trackers on the web page have been detected.

Reference is made to FIG. 30, which is a screen shot of on/off controls 620 for turning tracker blocking on and off, in accordance with an embodiment of the present invention. The blocked trackers, namely, Amazon.com, Casale Media, Krux, etc., are displayed with a strikethrough.

Reference is made to FIG. 31, which is a screen shot of a web page that is reloaded after trackers are blocked, in accordance with an embodiment of the present invention. The web page in FIG. 31 is from the same website as the web page of FIG. 29, but is reloaded by the web browser without the various trackers that were present in FIG. 29.

Figure 32:
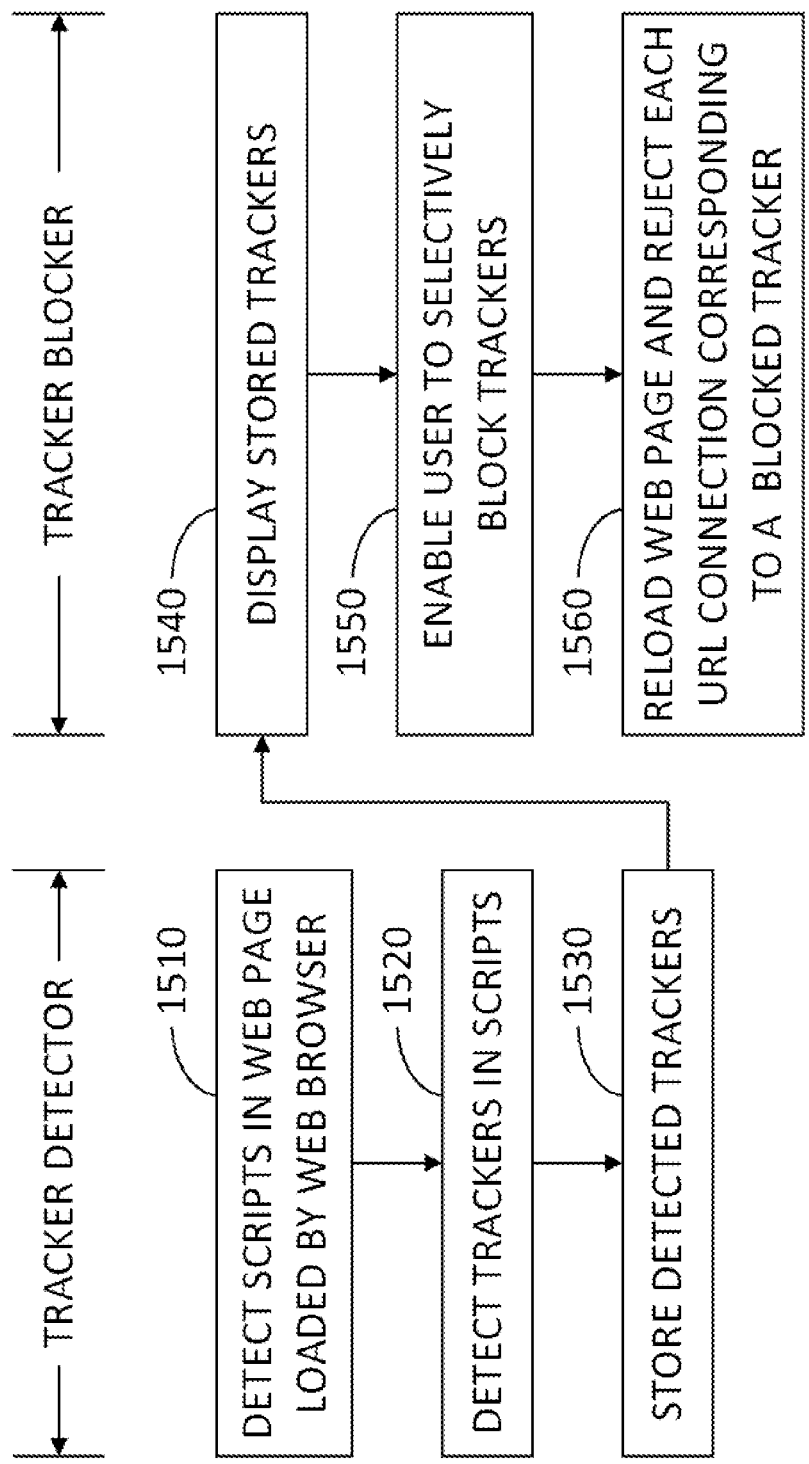
FIG. 32 is a simplified flowchart of a method for tracker detection and blocking, in accordance with an embodiment of the present invention.

Reference is made to FIG. 32, which is a simplified flowchart of a method for tracker detection and blocking, in accordance with an embodiment of the present invention. The flowchart of FIG. 32 is divided into two columns, the left column indicating operations performed by tracker detector 160, and the right column indicating operations performed by tracker blocker 170. Prior to operation 1510, web browser 130 loads a full web page. For an Android operating system implementation, tracker detector 160 may call a method didFinishLoading ( ) to confirm that the web page is fully loaded. For an iOS operating system implementation, tracker detector 160 may call a method webViewDidFinishLoad ( ) to confirm that the web page is fully loaded.

At operation 1510 tracker detector 160 scans the loaded web page to detect the presence of scripts in the loaded web page. For an Android operating system implementation, tracker detector 160 may call a method evaluateJavascript ( ) to scan all Javascript present in the web page, one at a time. Method evaluateJavascript ( ) belongs to class android.WebviewClient. For an iOS operating system implementation, the innerHTML of the page may be read, and script tags may be found using class NSScanner.

At operation 1520 tracker detector 160 compares the URL content of each detected script with a list of known tracker URL connections, to detect the trackers in each script. The list of known URL tracker connections may be stored in tracking database 260, and updated from time to time. In accordance with an embodiment of the present invention, the tracker data in tracking database 260 is downloaded to client computer 100 each time web browser 130 is launched. Whenever URL content of a detected script matches a known URL connection in tracking database 260, a tracker count is incremented. The tracker count is displayed inside control 610, as shown in FIGS. 27 and 30. A sample list of known URL connections is available from Disconnect, Inc. of San Francisco, Calif. at https://raw.githubusercontent.com/disconnectme/disconnect-tracking-protection/master/services.json At operation 1530 tracker detector 160 stores the detected trackers, so that they may be accessed by tracker blocker 170.

At operation 1540 tracker blocker 170 displays the trackers that were stored by tracker detector 160 at operation 1530, in a presentation such as that shown in FIG. 29, where each tracker is displayed with a corresponding on/off control 620. The display may be organized in categories including advertising trackers, analytics trackers, content trackers and social trackers.

At operation 1550 tracker blocker 170 enables a user to selectively block one or more of the displayed trackers by means of controls 620. The user may block individual trackers one by one, or may block an entire category of trackers at once, such as blocking all advertising trackers. In an embodiment of the present invention user blocking selections are preserved, and when a tracker is blocked on a specific web page, it remains blocked on all web pages that the user visits, until the user unblocks the tracker.

It has been found that blocking of some trackers may prevent a web page from fully loading. For example, the formatting of a web page may depend on a tracker, and if the tracker is blocked then the web page may not fully load. In accordance with an embodiment of the present invention, a white list of non-blockable trackers is maintained, in order to avoid such a situation where a web page does not load. The white list is loaded into client computer device 100 upon launch of web browser 130, and overrides the list of trackers in tracker database 260. Specifically, the URL connections corresponding to the non-blockable trackers in the white list are ignored at operation 1520. As such, the non-blockable trackers in the white list are not stored at operation 1530 and not displayed to the user at operation 1540.

At operation 1560 tracker blocker 170 reloads the web page, rejecting the URL corresponding to each tracker that the user selected to block. For an Android operating system implementation, tracker blocker 170 may call a method shouldInterceptRequest ( ) for each URL that is loaded. Method shouldInterceptRequest ( ) belongs to class android.WebviewClient, and is operative to intercept a URL connection, and to either accept or reject the connection. If a URL connection is selected for blocking, then the URL connection is rejected using this method. For an iOS operating system implementation, tracker blocker 170 may call a similar method in class NSURLProtocol.

In the foregoing specification, the invention has been described with reference to specific exemplary embodiments thereof. It will, however, be evident that various modifications and changes may be made to the specific exemplary embodiments without departing from the broader spirit and scope of the invention. Accordingly, the specification and drawings are to be regarded in an illustrative rather than a restrictive sense.

What is claimed is:

1. A non-transitory computer readable medium storing instructions, which, when executed by a processor of an electronic device, cause the processor to dynamically inspect uniform resource locators (URLs) for respective web pages, comprising:
   receive as input a time series of URLs for respective web pages, the URLs denoted $URL_1$, $URL_2$, . . . ;
   inspect the time series of URLs, comprising, for each $URL_n$:
      when a risk level evaluation for $URL_n$ resides in a cache, determine whether $URL_n$ is deemed safe based on the cached risk level evaluation; and
      when a risk level evaluation for $URL_n$ does not reside in cache:
         perform a risk level evaluation for $URL_n$ using one or more virus scanners;
         store the risk level evaluation for $URL_n$ in the cache; and
         determine whether $URL_n$ is deemed safe based on the performed risk level evaluation;
      when $URL_n$ is deemed safe, load and display the web page for $URL_n$; and
      when $URL_n$ is not deemed safe, block the web page for $URL_n$ from being loaded and displayed; and
   further inspect the time series of $URL_n$, comprising:
      regardless of whether $URL_n$ is deemed safe or is not deemed safe, determine whether a quality assurance (QA) sample selection criterion is met for $URL_n$;
      when the QA sample selection criterion is met, send $URL_n$ to an evaluator server for behavioral analysis identifying suspicious operations performed by content of the web page for $URL_n$,
   wherein the QA sample selection criterion is to select every $N^{th}$ URL for behavioral analysis evaluation, where N is a positive integer.

2. The non-transitory computer readable medium of claim 1 wherein the instructions further cause the processor to display a bar with URL evaluation data for a pre-configured period of time, at the bottom of the displayed web page for $URL_n$.

3. The non-transitory computer readable medium of claim 1 wherein the processor receives $URL_n$ as input, in response to activation of a user interface control displayed below a currently displayed web page.

4. The non-transitory computer readable medium of claim 1 wherein the instructions further cause the processor to generate an audible alert when the web page of $URL_n$ is blocked from being loaded and displayed.

5. The non-transitory computer readable medium of claim 1 wherein the instructions further cause the processor to immediately load and display the web page of $URL_n$ when $URL_n$ is known to be trusted.

6. A non-transitory computer readable medium storing instructions, which, when executed by a processor of an electronic device, cause the processor to dynamically inspect uniform resource locators (URLs) for respective web pages, comprising:
  receive as input a time series of URLs for respective web pages, the URLs denoted $URL_1$, $URL_2$, . . . ;
  inspect the URLs, comprising, for each $URL_n$:
    when a risk level evaluation for $URL_n$ resides in a cache, determine whether $URL_n$ is deemed safe based on the cached risk level evaluation; and
    when a risk level evaluation for $URL_n$ does not reside in cache:
      perform a risk level evaluation for $URL_n$ using one or more virus scanners;
      store the risk level evaluation for $URL_n$ in the cache; and
      determine whether $URL_n$ is deemed safe based on the performed risk level evaluation;
    when $URL_n$ is deemed safe, load and display the web page for $URL_n$; and
    when $URL_n$ is not deemed safe, block the web page for $URL_n$ from being loaded and displayed; and
    further inspect the $URL_n$, comprising:
      regardless of whether $URL_n$ is deemed safe or is not deemed safe, determine whether a quality assurance (QA) sample selection criterion is met for $URL_n$;
      when the QA sample selection criterion is met, send $URL_n$ to an evaluator server for behavioral analysis identifying suspicious operations performed by content of the web page for $URL_n$,
    wherein the QA sample selection criterion is to randomly select URLs for behavioral analysis evaluation.

7. The non-transitory computer readable medium of claim 6 wherein the instructions further cause the processor to display a bar with URL evaluation data for a pre-configured period of time, at the bottom of the displayed web page for $URL_n$.

8. The non-transitory computer readable medium of claim 6 wherein the processor receives $URL_n$ as input, in response to activation of a user interface control displayed below a currently displayed web page.

9. The non-transitory computer readable medium of claim 6 wherein the instructions further cause the processor to generate an audible alert when the web page of $URL_n$ is blocked from being loaded and displayed.

10. The non-transitory computer readable medium of claim 6 wherein the instructions further cause the processor to immediately load and display the web page of $URL_n$ when $URL_n$ is known to be trusted.

* * * * *